(12) United States Patent
Mora et al.

(10) Patent No.: US 9,147,190 B2
(45) Date of Patent: Sep. 29, 2015

(54) SECURING USER ACCESS TO A PARAMETER VALUE ACROSS A SOFTWARE PRODUCT LINE DIFFERENTLY FOR DIFFERENT PRODUCTS

(75) Inventors: Gary Anthony Mora, San Leandro, CA (US); Bhupinder Singh Sondhi, Fremont, CA (US); Naomi Dorsch, Sunnyvale, CA (US); Chi Ken Young, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 691 days.

(21) Appl. No.: 12/697,196

(22) Filed: Jan. 29, 2010

(65) Prior Publication Data

US 2011/0191213 A1   Aug. 4, 2011

(51) Int. Cl.
G06Q 20/00 (2012.01)
G06Q 20/40 (2012.01)
G06Q 40/00 (2012.01)

(52) U.S. Cl.
CPC ............... *G06Q 20/40* (2013.01); *G06Q 40/12* (2013.12)

(58) Field of Classification Search
None
See application file for complete search history.

(56) References Cited

U.S. PATENT DOCUMENTS

| 7,131,000 | B2 * | 10/2006 | Bradee | 713/164 |
| 7,272,625 | B1 * | 9/2007 | Hannel et al. | 709/200 |
| 2006/0156384 | A1 * | 7/2006 | Minium et al. | 726/2 |
| 2009/0249436 | A1 * | 10/2009 | Coles et al. | 726/1 |

OTHER PUBLICATIONS

Rinkesh Garg "PeopleSoft Security Dynamic Role Rules", believed to be prior to the filing date, p. 1-33.
Implementing Security in PeopleSoft, believed to be prior to the filing date, p. 1-14.
Understanding PeopleSoft Security, retrieved from https://psfn.maine.edu:7402/PSOL/SABOOKS/eng/psbooks/tsec/htm/tsec03.htm on Jul. 10, 2008, p. 1-11.
Oracle Applications, Flexfields Guide, Release 12, Part No. B31456-01, Dec. 2006, p. 1-344.
Oracle Procurement, Buyer's Guide to Punchout and Transparent Punchout, Release 11i, Part No. B13856-01, Jul. 2004, p. 1-14.
Oracle Apps Tutorials: Sys Admin—Users and Responsibilities, Article downloaded on Jun. 30, 2008 from the Internet at the following address: http://www.scribd.com/doc/3185935/Basic-Oracle-Applications, p. 1-9.
Oracle Procurement, Implementation Guide, Release 11i, Part No. A85361-04, Aug. 2003, Chapter 2, p. 1-71.
Oracle Procurement, Implementation Guide, Release 11i, Part No. A85361-04, Aug. 2003, Chapter 3, p. 1-81.

* cited by examiner

*Primary Examiner* — Fateh Obaid
(74) *Attorney, Agent, or Firm* — Omkar K. Suryadevara; Silicon Valley Patent Group LLP

(57) ABSTRACT

A computer is programmed to receive from an administrator, a rule specifying one or more values of a parameter, identification of software wherein the rule is to be applied, and identification of a user on whom the rule is to be applied. The computer stores an association between the rule, the identified user and the identified software. On receipt of input from the identified user, to access the identified software, the computer uses the association to retrieve the rule, apply the rule to select information based on the value(s) specified in the rule, and execute the identified software to display the selected information to the identified user. Use of a rule that is specific to the user and also specific to the software enables the computer to support security for each user differently for different pieces of software in a software product line.

31 Claims, 42 Drawing Sheets

FIG. 1A (prior art)

Security Options

TYPE OF SECURITY
- ○ No Security
- ● User ID Level Security
- ○ Permission List Level Security

SECURED FIELDS

| ☑ Business Unit | ☐ Setid | ☑ Ledger |
|---|---|---|
| ☐ Book | ☐ Pay Cycle | |
| ☑ Project | Proj Security Type: | [▼] |

Use list
Use tree

[Save] [Notify]

FIG. 1B (prior art)

Business Unit Security By User ID

User ID: VP1

Accessible Business Units — Customize | Find | View All | First ◀ 1-9 of 9 ▶ Last

| Business Unit | | Description | | |
|---|---|---|---|---|
| BUY01 | 🔍 | Dean Jones & Bishop | + | − |
| BUY02 | 🔍 | DS Telecommunications | + | − |
| BUY03 | 🔍 | Choice Industries | + | − |
| BUY04 | 🔍 | Jean Paul Inc | + | − |
| BUY05 | 🔍 | Le Groupe D'international | + | − |
| BUY06 | 🔍 | TR Services Financiers | + | − |
| BUY07 | 🔍 | Walton Bros | + | − |
| BUY08 | 🔍 | Selectronic Corporation | + | − |
| US001 | 🔍 | US001 NEW YORK OPERATIONS | + | − |

FIG. 1C (prior art)

Ledger Security by User ID

User ID: VP1

| Accessible Ledgers | | | | Customize Find |
|---|---|---|---|---|
| Ledger Type | Detail Ledger Group | Summary Ledger | Description | |
| Detail ▼ | CC_FS_EXP ▼ | | Funding Source Expense Group | |

FIG. 1D (prior art)

Project Security

User: VP1    Name: Kenneth Schumacher

User, Tree-Based Security                     Find  View All

*Tree Business Unit: US004

*Tree Name: US004_PROJECTS    *Tree Effective Date: 01/01/1990

| User Role in Projects | | | | Customize | Find View All | |
|---|---|---|---|---|---|---|
| *Project | Description | *Project Role | Description | Project Access | Activity Access | |
| IMPLEMENT | Implementation | PROJ MANAGER | Current Project Manager | Read/Write | Read/Write | |

FIG. 1E (prior art)

Security Views

| Security Views | | | | | | |
|---|---|---|---|---|---|---|
| | | | Customize \| Find \| View All \| ◀ First | 1-292 ▲ | Last | |
| SP_AC_CNT_ | SP_AC_CNT_NONVW | 🔍 | SP_AC_CNT_OPRVW | 🔍 | SP_AC_CNT_CLSVW | 🔍 SetID ▸ ⊞ ▯ |
| SP_AMBUAM_ | SP_AMBUAM_NONVW | 🔍 | SP_AMBUAM_OPRVW | 🔍 | SP_AMBUAM_CLSVW | 🔍 Unit ▸ ⊞ ▯ |
| SP_AMBUAP_ | SP_AMBUAP_NONVW | 🔍 | SP_AMBUAP_OPRVW | 🔍 | SP_AMBUAP_CLSVW | 🔍 Unit ▸ ⊞ ▯ |
| SP_AMBUPO_ | SP_AMBUPO_NONVW | 🔍 | SP_AMBUPO_OPRVW | 🔍 | SP_AMBUPO_CLSVW | 🔍 Unit ▸ ⊞ ▯ |
| SP_AMBURE_ | SP_AMBURE_NONVW | 🔍 | SP_AMBURE_OPRVW | 🔍 | SP_AMBURE_CLSVW | 🔍 Unit ▸ ⊞ ▯ |
| SP_AMPPRF_ | SP_AMPPRF_NONVW | 🔍 | SP_AMPPRF_OPRVW | 🔍 | SP_AMPPRF_CLSVW | 🔍 Unit ▸ ⊞ ▯ |
| SP_AMPREI_ | SP_AMPREI_NONVW | 🔍 | SP_AMPREI_OPRVW | 🔍 | SP_AMPREI_CLSVW | 🔍 Unit ▸ ⊞ ▯ |
| SP_AOLN3_ | SP_AOLN3_NONVW | 🔍 | SP_AOLN3_OPRVW | 🔍 | SP_AOLN3_CLSVW | 🔍 Unit ▸ ⊞ ▯ |
| SP_APPR_ | SP_APPR_NONVW | 🔍 | SP_APPR_OPRVW | 🔍 | SP_APPR_CLSVW | 🔍 Unit ▸ ⊞ ▯ |
| SP_AR_SET_ | SP_AR_SET_NONVW | 🔍 | SP_AR_SET_OPRVW | 🔍 | SP_AR_SET_CLSVW | 🔍 Unit ▸ ⊞ ▯ |

| FIELD NAME | TYPE | REQUIRED | EDIT | PROMPT EDIT TABLE |
|---|---|---|---|---|
| BUSINESS_UNIT | Char | Yes | Prompt | SP_BU_GL_NONVW |
| JOURNAL_ID | Char | Yes | | |
| JOURNAL_DATE | Date | Yes | | |
| ... | ... | ... | ... | ... |
| LEDGER | Char | Yes | Prompt | LED_GRP_LED_TBL |
| ACCOUNT | Char | No | Prompt | %EDIT_ACCOUNT |
| DEPTID | Char | No | Prompt | %EDIT_DEPT |
| CURRENCY | Char | No | Prompt | CURRENCY_CD_TBL |

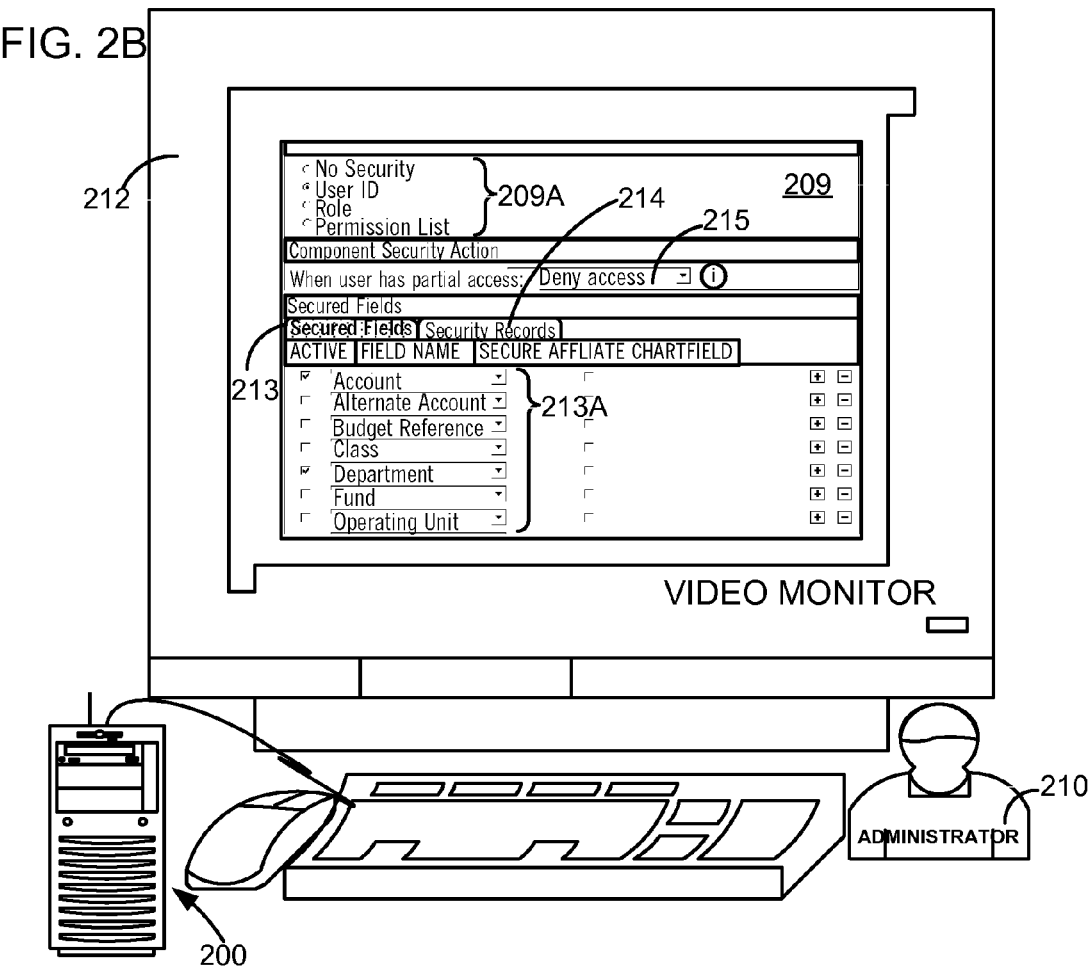

FIG. 2C

ChartField Security

| Security Options | Products |

Component Security Action
- ○ No Security
- ● User ID
- ○ Role
- ○ Permission List

Component Security Action

When user has partial access: [Deny Access ▼] ⊙

Secured Fields | Security Records

| | Secured Fields 251 | 252 | 253 | 254 255 | |
|---|---|---|---|---|---|
| ▶ | Account | SEC_ACCT_USER | ⚲ SEC_ACCT_ROLE | ⚲ SEC_ACCT_PERM | ⚲ ⊞ ▬ |
| ☐ | Alternate Account | SEC_ALTACT_USER | ⚲ SEC_ALTACT_ROLE | ⚲ SEC_ALTACT_PERM | ⚲ ⊞ ▬ |
| ☐ | Budget Reference | SEC_BUDREF_USER | ⚲ SEC_BUDREF_ROLE | ⚲ SEC_BUDREF_PERM | ⚲ ⊞ ▬ |
| ☐ | Class Field | SEC_CLSCF_USER | ⚲ SEC_CLSCF_ROLE | ⚲ SEC_CLSCF_PERM | ⚲ ⊞ ▬ |
| ▶ | Department 256 | SEC_DEPT_USER | ⚲ SEC_DEPT_ROLE | ⚲ SEC_DEPT_PERM | ⚲ ⊞ ▬ |
| ☐ | Fund Code | SEC_FUND_USER 257 | ⚲ SEC_FUND_ROLE | ⚲ SEC_FUND_PERM | ⚲ ⊞ ▬ |
| ☐ | Operating Unit | SEC_OU_USER | ⚲ SEC_OU_ROLE | ⚲ SEC_OU_PERM | ⚲ ⊞ ▬ |
| ☐ | Product | SEC_PROD_USER | ⚲ SEC_PROD_ROLE | ⚲ SEC_PROD_PERM | ⚲ ⊞ ▬ |
| ☐ | Program Code | SEC_PROG_USER | ⚲ SEC_PROG_ROLE | ⚲ SEC_PROG_PERM | ⚲ ⊞ ▬ |

FIG. 2E

Component Registry

Secured Components

Filter

Active Flag [Active ▼]  Component [🔍 J]  Source Product [General Ledger ▼]  [Apply Filter]

Filter

Options: Record Details

| Active | Component (name) | Component (description) | Source Product | Component Security Action | | |
|---|---|---|---|---|---|---|
| ☑ | JGEN_ACCTG_DRILL | Generic Accounting Drill | General Ledger ▼ | Default from Higher Level ▼ | + | □ |
| ☑ | JOURNAL_ENTRY_IE | Journal Entry | General Ledger ▼ | Default from Higher Level ▼ | + | □ |
| ☑ | JOURNAL_FS | Journal Status | General Ledger ▼ | Default from Higher Level ▼ | + | □ |
| ☑ | JOURNAL_INQUIRY | Journal Inquiry | General Ledger ▼ | Default from Higher Level ▼ | + | □ |
| ☑ | JOURNAL_OPEN_ITEMS | Open Item Maintenance | General Ledger ▼ | Default from Higher Level ▼ | + | □ |
| ☑ | JOURNAL_POST_MARK | Mark Journals for Post | General Ledger ▼ | Default from Higher Level ▼ | + | □ |
| ☑ | JOURNAL_UNPOST_MRK | Mark Journals for Unpost | General Ledger ▼ | Default from Higher Level ▼ | + | □ |
| ☑ | JRNL_SUSPENSE_COR | Journal Suspense Correction | General Ledger ▼ | Default from Higher Level ▼ | + | □ |

FIG. 2K

Define Security Rules
- Assign Rule to User
- Assign Rule to Role
- Assign Rule to Permission List
- Copy Rule Assignments
- △ Security Edit Tables
- Secure Chartfield Options
- Register Components
- Security Options
- Unit by User ID
- Unit by Permission List
- TableSet by User ID
- TableSet by Permission List
- Ledger by User ID
- Ledger by Permission
- Book by User ID
- Book by Permission List
- Pay Cycle by User ID
- Pay Cycle by Permission List
- Project Security
- Security View Names
- Apply Security Setups
- ChartField Pagelet Security
- nVision Ledger Security
- Grants Security

Look Up To Value

SetID: SHARE
Account: [begins with ▼] 63
Description: [begins with ▼]
Account Type: [begins with ▼]

Look Up | Clear | Cancel | Basic Lookup

Search Results

| | | | | | |
|---|---|---|---|---|---|
| 630000 | Office Supplies | E | N | B | BS |
| 631000 | Computer Supplies | E | N | B | BS |
| 632000 | Maintenance Contract Expense | E | N | B | BS |
| 633000 | Dues & Subscriptions | E | N | B | BS |
| 634000 | Postage | E | N | B | BS |
| 635000 | Freight | E | N | B | BS |
| 636000 | Equipment Maintenance | E | N | (blank) | (blank) |

Local intranet

| Assign Rules | Exceptions | Security Values |

Security Rule Values

User ID: VP1

TYPE OF SECURITY

*Field Name: [Department ▼]

Security Values

| SOURCE PRODUCT | DEPARTMENT |
|---|---|
| Manufacturing | |
| Expenses | 10000 |
| Expenses | 11000 |
| Expenses | 12000 |
| Expenses | 13000 |
| Expenses | 14000 |
| Expenses | 15000 |
| Order Management | |
| General Ledger | 10000 |
| General Ledger | 11000 |
| General Ledger | 12000 |
| General Ledger | 13000 |
| General Ledger | 14000 |
| General Ledger | 15000 |

(291 marks the Manufacturing group; 292 marks the Order Management group)

[Save] [Return to Search] [Notify]

Assign Rules | Exceptions | Security Values

FIG. 20

| Component Registry | | | | | | |
|---|---|---|---|---|---|---|
| Secured Components | | | | | | |
| Filter | | | | | | |
| Active Flag | Active | Component | J | | Source Product | General Ledger |
| Register Components | | | | | | |
| Options / Record Details | | | | | | |
| Active | Component | | Description of Component | | Header Record | Detail |
| ☑ | JGEN_ACCTG_DRILL | | Generic Accounting Drill | | JRNL_LN_FS | Detail |
| ☑ | JOURNAL_ENTRY_IE | | Journal Entry | | JRNL_HEADER | Detail |
| ☑ | JOURNAL_FS | | Journal Status | | JRNL_LN_FS | Detail |
| ☑ | JOURNAL_INQUIRY | | Journal Inquiry | | INQ_CRIT_TBL | Detail |
| ☑ | JOURNAL_OPEN_ITEMS | | Open Item Maintenance | | GL_OI_CRITERIA | Detail |
| ☑ | JOURNAL_POST_MARK | | Mark Journals for Post | | JRNL_TO_POST_VW | Detail |
| ☑ | JOURNAL_UNPOST_MRK | | Mark Journals for Unpost | | JRNL_POSTED_VW | Detail |
| ☑ | JRNL_SUSPENSE_COR | | Journal Suspense Correction | | JRNL_S_HDR_SRCH | Detail |

FIG. 2P

| Component Details | | |
|---|---|---|
| Component: | JGEN_ACCTG_DRILL | Generic Accounting Drill |
| DETAILS | | |
| Active | *Detail Record | Record Description |
| ☑ | JGEN_ACCT_DRILL 🔍 | JrnlGen Accounting Entry Table |
| ☑ | JRNL_LN_FS 🔍 | Journal Line Data |

Chartfield Security Edit Tables

Edit Table Set: STND
*Description: Standard
Long Description: Standard Edit Tables — 261

Define Edit Tables

| *Field Name | Edit Table | User ID Security View | Role Security View — 263 | Permission List Security View — 264 | | |
|---|---|---|---|---|---|---|
| Account | GL_ACCT_CTLB_VW | SEC_ACCT_CB_UVW | SEC_ACCT_CB_RVW | SEC_ACCT_CB_PVW | + | – |
| Alternate Account | ALTACCT_CNTL_VW | SEC_ALT_CT_UVW | SEC_ALT_CT_RVW | SEC_ALT_CT_PVW | + | – |
| Operating Unit | OPER_UNIT_TBL | SEC_OU_UVW | SEC_OU_RVW | SEC_OU_PVW | + | – |
| Fund Code | FUND_TBL | SEC_FUND_UVW | SEC_FUND_RVW | SEC_FUND_PVW | + | – |
| Department | DEPT_TBL | SEC_DEPT_UVW | SEC_DEPT_RVW | SEC_DEPT_PVW | + | – |
| Program Code | PROGRAM_TBL | SEC_PROG_UVW | SEC_PROG_RVW | SEC_PROG_PVW | + | – |
| Class Field | CLASS_CF_TBL | SEC_CLSCF_UVW | SEC_CLSCF_RVW | SEC_CLSCF_PVW | + | – |
| Budget Reference | BUD_REF_TBL | SEC_BUDREF_UVW | SEC_BUDREF_RVW | SEC_BUDREF_PVW | + | – |
| Product | PRODUCT_TBL | SEC_PROD_UVW | SEC_PROD_RVW | SEC_PROD_PVW | + | – |
| Project | PC_BUPC_PROJ | SEC_PRJBUPC_UVW | SEC_PRJBUPC_RVW | SEC_PRJBUPC_PVW | + | – |
| Fund Affiliate | AFFINTRA1_VW | SEC_AFFIN1_UVW | SEC_AFFIN1_RVW | SEC_AFFIN1_PVW | + | – |
| Operating Unit Affiliate | AFFINTRA2_VW | SEC_AFFIN2_UVW | SEC_AFFIN2_RVW | SEC_AFFIN2_PVW | + | – |

262

[Save] [Return to Search] [Previous in List] [Next in List] [Modify] [Add] [Update/Display]

FIG. 2S

Dynamic Edit Tables

Define Edit Tables

| *Field Name | | Edit Table | | User ID Security View | | Role Security View | | Permission List Security View | | |
|---|---|---|---|---|---|---|---|---|---|---|
| Account | ▼ | ACCT_STA_BI_VW | 🔍 | SEC_ACCTSTA_UVW | 🔍 | SEC_ACCTSTA_RVW | 🔍 | SEC_ACCTSTA_PVW | + | – |
| Account | ▼ | ALTX_ACCT_VW | 🔍 | SEC_AXACCT_UVW | 🔍 | SEC_AXACCT_RVW | 🔍 | SEC_AXACCT_PVW | + | – |
| Account | ▼ | ALTX_ACCT_VW2 | 🔍 | SEC_ALTXACT_UVW | 🔍 | SEC_ALTXACT_RVW | 🔍 | SEC_ALTXACT_PVW | + | – |
| Account | ▼ | AR_ACCT_ALL_VW | 🔍 | SEC_ARACCT_UVW | 🔍 | SEC_ARACCT_RVW | 🔍 | SEC_ARACCT_PVW | + | – |
| Account | ▼ | BI_GLACCT_IU_VW | 🔍 | SEC_ACCT_IU_UVW | 🔍 | SEC_ACCT_IU_RVW | 🔍 | SEC_ACCT_IU_PVW | + | – |
| Account | ▼ | GL_ACCOUNT_TBL | 🔍 | SEC_ACCT_CB_UVW | 🔍 | SEC_ACCT_CB_RVW | 🔍 | SEC_ACCT_CB_PVW | + | – |
| Account | ▼ | GL_ACCT_BUGL_VW | 🔍 | SEC_ACCT_BU_UVW | 🔍 | SEC_ACCT_BU_RVW | 🔍 | SEC_ACCT_BU_PVW | + | – |
| Account | ▼ | GL_ACCT_CNTL_VW | 🔍 | SEC_ACCT_CT_UVW | 🔍 | SEC_ACCT_CT_RVW | 🔍 | SEC_ACCT_CT_PVW | + | – |
| Account | ▼ | GL_ACCT_CTLB_VW | 🔍 | SEC_ACCT_CB_UVW | 🔍 | SEC_ACCT_CB_RVW | 🔍 | SEC_ACCT_CB_PVW | + | – |
| Account | ▼ | GL_ACCT_MON_VW | 🔍 | SEC_ACCTMON_UVW | 🔍 | SEC_ACCTMON_RV | 🔍 | SEC_ACCTMON_PVW | + | – |
| Account | ▼ | KK_ACCT_NOST_VW | 🔍 | SEC_ACCT_NS_UVW | 🔍 | SEC_ACCT_NS_RVW | 🔍 | SEC_ACCT_NS_PVW | + | – |
| Alternate Account | ▼ | ALTACCT_BUGL_VW | 🔍 | SEC_ALT_BU_UVW | 🔍 | SEC_ALT_BU_RVW | 🔍 | SEC_ALT_BU_PVW | + | – |
| Alternate Account | ▼ | ALTACCT_CNTL_VW | 🔍 | SEC_ALT_CT_UVW | 🔍 | SEC_ALT_CT_RVW | 🔍 | SEC_ALT_CT_PVW | + | – |
| Alternate Account | ▼ | ALTX_ALT_VW | 🔍 | SEC_AXALT_UVW | 🔍 | SEC_AXALT_RVW | 🔍 | SEC_AXALT_PVW | + | – |
| Alternate Account | ▼ | ALTX_ALT_VW2 | 🔍 | SEC_ALTXALT_UVW | 🔍 | SEC_ALTXALT_RVW | 🔍 | SEC_ALTXALT_PVW | + | – |

271 272 273 274

[Save] [Notify]

FIG. 3B

Create/update Journal Entries
- Copy Journals
  △ Standard Journals
  △ Import Journals
  △ Subsystem Journals
  △ Process Journals
  △ Suspense Correction
  △ Ledgers
  △ Summary Ledgers
  △ Close Ledgers
  △ Process Multi-Currency
  △ Average Daily Balance
  △ Open Items
  △ Consolidate Financial Data
  △ Maintain Standard Budgets
  △ Monitor Background Process
  △ Review Financial Information
  △ Regulatory Ledger Reports
  △ XBRL
  △ Cash Flow Statement
  △ General Reports
  △ Federal Reports
  - General Ledger Center
  △ Allocations
  △ Statutory Reports Enter any information you have and click Search. Leave fields blank for a list of all values.

| Find an Existing Value | Add a New Value |

Business Unit: [=▼] [US001]
Journal ID: [begins with ▼] [       ] 🔍
Journal Date: [=▼] [       ]
Document Sequence Number: [begins with ▼] [       ]
Line Business Unit: [=▼] [       ] 🔍
Journal Header Status: [=▼] [No Status - Needs to be Edited ▼]
Budget Checking Header Status: [=▼] [       ▼]
Source: [=▼] [CFO] 🔍

[Search] [Clear] | Basic Search  📄 Save Search Criteria

Search Results
View All ← 341

| BUSINESS UNIT | JOURNAL ID | JOURNAL DATE | DOCUMENT SEQUENCE NO. | LINE BUSINESS UNIT | JOURNAL HEADER STATUS | LEDGER GROUP | CURRENCY CODE | JOURNAL TOTAL DEBITS |
|---|---|---|---|---|---|---|---|---|
| US001 | 80000155 | 07/08/2003 | (blank) | US001 | Edit Req'd | RECORDING | USD | 3000 |
| US001 | 800_00155 | 07/08/2003 | (blank) | EGY03 | Edit Req'd | RECORDING | USD | 0 |
| US001 | GL20000000117/2004 | ... | (blank) | US001 | Edit Req'd | RECORDING | USD | 2000 |

Business Unit: [=] [▼] US001
Journal ID: [begins with ▼] 0000000002
Journal Date: [=] [▼] 02/20/2001
Document Sequence Number: [begins with ▼]
Line Business
Journal Header ┌─ Microsoft Internet Explorer ─────────────────── [X] ┐
Budget Checkir │                                                      │
Source:        │  [!] This transaction may not be accessed due to ChartField Security (xxx,xx)
User ID:       │      You may not view the transaction because it contains one or more ChartField values which you
Attachment Exi │      are unauthorized to view. Please contact your security administrator for more information.
               │                                                      │
☐ Case Sensitive│                       [ OK ]                         │
               └──────────────────────────────────────────────────────┘
                                                        ╲___343

[ Search ] [ Clear ] | Basic Search | 🔍 Save Search Criteria

Search Results
View All

| BUSINESS UNIT | JOURNAL ID | JOURNAL DATE | DOCUMENT SEQUENCE NO. | LINE BUSINESS UNIT | JOURNAL HEADER STATUS | LEDGER GROUP | CURRENCY CODE | JOURNAL TOTAL DEBITS |
|---|---|---|---|---|---|---|---|---|
| US001 | 0000000002 | 02/20/2001 | (blank) | US001 | Edit Reqd | RECORDING ONL | USD | 482000 |
| US001 | 0000000002 | 02/20/2001 | (blank) | US003 | Edit Reqd | RECORDING ONL | USD | 0 |
| US001 | 0000000002 | 02/20/2001 | (blank) | US004 | Edit Reqd | RECORDING ONL | USD | 0 |
| US001 | 0000000002 | 02/20/2001 | (blank) | US005 | Edit Reqd | RECORDING ONL | USD | 0 |
| US001 | 000\0000004 | 06/30/2003 | (blank) | US001 | Posted | RECORDING ONL | USD | 1000 |
| US001 | 0000000005 | 05/15/2001 | (blank) | US001 | Edit Reqd | RECORDING ONL | USD | 6168.36 |
| US001 | 0000000006 | 04/20/2001 | (blank) | US001 | Edit Reqd | RECORDING ONL | USD | 400000 |

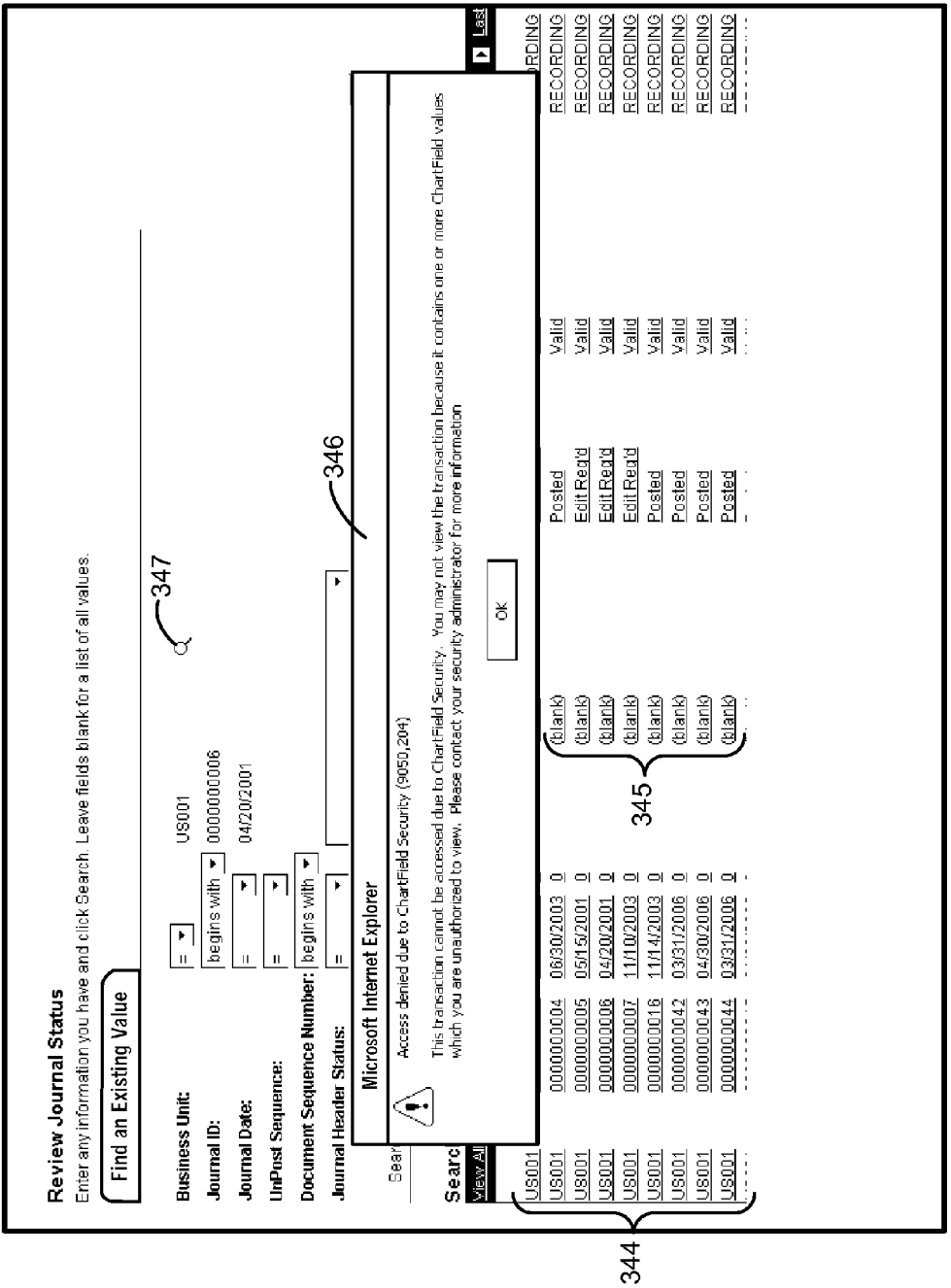

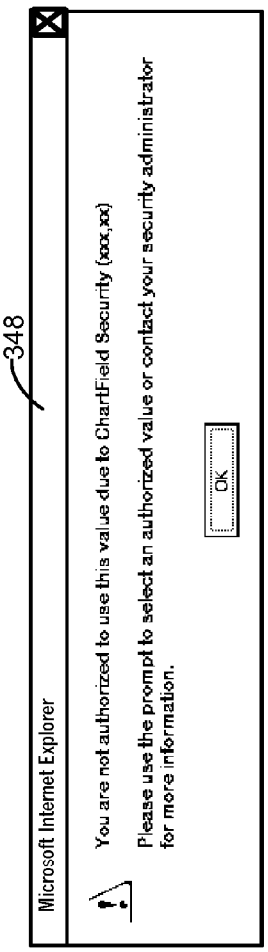

FIG. 3F

Ledger Inquiry

Enter ledger, period, ChartField and rest of the criteria. Click on Search button to execute the query.

Ledger Criteria

| Inquiry Name | *Unit | *Ledger | *Fiscal Year | *From Period | *To Period | Currency | Stat Code |
|---|---|---|---|---|---|---|---|
| MYINQUIRY | US001 🔍 | LOCAL 🔍 | 2001 🔍 | 1 🔍 | 13 🔍 | 🔍 | 🔍 |

☐ Show YTD Balance ☐ Include Closing Adjustments
☐ Show Transaction Details ☐ Only in Base Currency   Max Ledger Rows: 100

[Search] [Clear] [Delete]

Chartfield Criteria

| CHARTFIELD | VALUE | CHARTFIELD VALUE SET | UPDATE /NEW | SUM BY | VALUE REQUIRED | ORDER BY | | Include Adjustment Periods | |
|---|---|---|---|---|---|---|---|---|---|
| Account | 🔍 | 🔍 | Update/New | ☑ | ☐ | 1 | | ☐ | 901 |
| Department | 🔍 | 🔍 | Update/New | ☑ | ☐ | 2 | | ☐ | 902 |
| Operating Unit | 🔍 | 🔍 | Update/New | ☐ | ☐ | | | ☐ | 903 |
| Product | 🔍 | 🔍 | Update/New | ☐ | ☐ | | | ☐ | 904 |
| Fund Code | 🔍 | 🔍 | Update/New | ☐ | ☐ | | | ☐ | 905 |
| Class Field | 🔍 | 🔍 | Update/New | ☐ | ☐ | | | ☐ | 906 |
| Program Code | 🔍 | 🔍 | Update/New | ☐ | ☐ | | | ☐ | 907 |
| Budget Reference | 🔍 | 🔍 | Update/New | ☐ | ☐ | | | ☐ | 908 |
| Affiliate | 🔍 | 🔍 | Update/New | ☐ | ☐ | | | ☐ | 909 |
| Fund Affiliate | 🔍 | 🔍 | Update/New | ☐ | ☐ | | | ☐ | 910 |
| Operating Unit Affiliate | 🔍 | 🔍 | Update/New | ☐ | ☐ | | | ☐ | 911 |
| Project | 🔍 | 🔍 | Update/New | ☐ | ☐ | | | ☐ | 912 |
| Adjustment Type | 🔍 | 🔍 | Update/New | ☐ | ☐ | | | ☐ | 998 |

FIG. 3G

Ledger Inquiry

Ledger Summary

Before clicking on Detail hyper link, you can click on "Configure Ledger Chartfield Display" to display the chartfields that are pertinent to your inquiry.

Ledger Criteria

| Inquiry Name | Unit | Ledger | Fiscal Year | From Period | To Period | Currency | Stat |
|---|---|---|---|---|---|---|---|
| MYINQUIRY | US001 | LOCAL | 2001 | 1 | 13 | | |

☐ Show YTD Balance   ☐ Include Closing Adjustments
☐ Show Transaction Details   ☐ Only in Base Currency Max Ledger Rows: 100

Go To: Inquiry Criteria

Ledger Detail Drill-Down Chartfield Display

Ledger Amount by Currency

| PERIOD | ACTIVITY | DETAIL | ACCOUNT | DEPT | ACCOUNT DESCRIPTION | PERIOD BALANCE (in transaction currency) | Currency | PERIOD BALANCE (in base currency) | Base Currency |
|---|---|---|---|---|---|---|---|---|---|
| 1 | Activity | Detail | 201000 | | A/P - GL Adj. | -450,000.00 | USD | -450,000.00 | USD |
| 1 | Activity | Detail | 402000 | | Freight Revenue | -4,539,004.00 | USD | -4,539,004.00 | USD |
| 1 | Activity | Detail | 430000 | | Returns and Allowances | 63,870.00 | USD | 63,870.00 | USD |
| 1 | Activity | Detail | 500000 | | Cost of Goods Sold | 1,598,031.00 | USD | 1,598,031.00 | USD |
| 1 | Activity | Detail | 610000 | | Salaries & Wages | 2,509,333.00 | USD | 2,509,333.00 | USD |
| 1 | Activity | Detail | 620000 | | Advertising | 817,770.00 | USD | 817,770.00 | USD |
| 12 | Activity | Detail | 115100 | | ST Investments under 1 Yr | 2,559,900.00 | USD | 2,559,900.00 | USD |
| 12 | Activity | Detail | 122000 | | Prepaid Expenses | 410,763.11 | USD | 410,763.11 | USD |
| 12 | Activity | Detail | 124000 | | Accrued Facility Fees | 30,459.55 | USD | 30,459.55 | USD |
| 12 | Activity | Detail | 130000 | | Receiving/Inspection Inventory | 1,100,422.89 | USD | 1,100,422.89 | USD |
| 12 | Activity | Detail | 150000 | | Land | 11,000,000.12 | USD | 11,000,000.12 | USD |
| 12 | Activity | Detail | 151000 | | Buildings and Improvements | 1,000,000.00 | USD | 1,000,000.00 | USD |
| 12 | Activity | Detail | 153000 | 20000 | Furniture and Fixtures | 2,050,000.00 | USD | 2,050,000.00 | USD |
| 12 | Activity | Detail | 154000 | 20000 | Machinery and Equip | 19,000,000.65 | USD | 19,000,000.65 | USD |

FIG. 3H

Accounting Summary

Search Criteria

| Unit | Source Code | Event ID | | Accounting ID | | Account | | Status | |
|---|---|---|---|---|---|---|---|---|---|
| US001 🔍 | ▼ | % | | % | 🔍 | | 🔍 | | ▼ Search |

From Date :: To Date ::

Summary Totals 0.00 DRs    0.00 CRs    0.00 Net

* Totals not available. Multiple currencies are presented. *

Accounting Summary

Accounting Detail

| Unit | Accounting ID | Line | Event | Date | GL Unit | Account | Status | Amount | Currency | Source | Event ID |
|---|---|---|---|---|---|---|---|---|---|---|---|
| US001 | 0000000004 | 1 | Init Pmt | 12/05/1998 | US001 | 100001 | Error | 1,000,000.00 | USD | Deals | TCORPBOND |
| US001 | 0000000004 | 2 | Init Pmt | 12/05/1998 | US001 | 275100 | Error | 935,833.33 | USD | Deals | TCORPBOND |
| US001 | 0000000004 | 3 | Init Pmt | 12/05/1998 | US001 | 212100 | Error | 64,166.67 | USD | Deals | TCORPBOND |
| US001 | 0000000005 | 1 | Int Accrue | 12/05/1998 | US001 | 212100 | Error | -111,733.48 | USD | Deals | TCORPBOND |
| US001 | 0000000005 | 2 | Int Accrue | 12/05/1998 | US001 | 820300 | Error | -111,733.48 | USD | Deals | TCORPBOND |
| US001 | 0000000006 | 1 | Per Pmt | 06/07/1999 | US001 | 100001 | Prvsn | -50,000.00 | USD | Deals | TCORPBOND |
| US001 | 0000000006 | 2 | Per Pmt | 06/07/1999 | US001 | 212100 | Prvsn | 50,000.00 | USD | Deals | TCORPBOND |
| US001 | 0000000007 | 1 | Mat Pmt | 12/05/1999 | US001 | 100001 | Prvsn | -1,150,558.74 | USD | Deals | TCORPBOND |

FIG. 3J

| Journal Suspense Correction | Errors |

Suspense Journal

Unit: US001  Journal ID: SUS-EDIT1  Date: 01/01/2004  Source: SUS  Go to Jrnl Entry (Suspense)

Correction Journal

**\*Journal ID: NEXT  \*Date:** 01/01/2004

Description: Correction of Suspense Journal SUS-EDIT1

Template List  Correct ChartField Errors  Change ChartField Values  Reversal: Do Not Generate Reversal ☐ Save Journal Incomplete Status  ☐ Bypass Budget Checking

Correction Journal Lines

| Ref No. | Error | Ledger | Event | Account | Alt Account | Oper Unit | Fund | Dept | Program | Class | Budget Ref |
|---|---|---|---|---|---|---|---|---|---|---|---|
| 1 | Errors | LOCAL | | 500000 🔍 | 🔍 | 🔍 | 🔍 | 🔍 | 🔍 | 🔍 | 🔍 |

🔍 Return to Search   ↑≣ Previous in List   ≣ Notify

🖫 Save

Journal Suspense Correction | Errors

FIG. 3M

Ledger Inquiry

Ledger Summary

Before clicking on Detail hyper link, you can click on "Configure Ledger Chartfield Display" to display the chartfields that are pertinent to your inquiry.

Ledger Criteria

| Inquiry Name | Unit | Ledger | Fiscal Year | From Period | To Period | Currency | Stat |
|---|---|---|---|---|---|---|---|
| MYINQUIRY | US001 | LOCAL | 2001 | 1 | 13 | | |

☐ Show YTD Balance  ☐ Include Closing Adjustments
☐ Show Transaction Details  ☐ Only in Base Currency Max Ledger Rows: 100

Go To: Inquiry Criteria

Ledger Detail Drill-Down Chartfield Display

Ledger Amount By Currency

| Period | Activity | Detail | Account | Dept | Account Description | PERIOD BALANCE (in transaction currency) | Currency | PERIOD BALANCE (in base currency) | Base Currency |
|---|---|---|---|---|---|---|---|---|---|
| 1 | Activity | Detail | 201000 | | A/P - GL Adj | -450,000.00 | USD | -450,000.00 | USD |
| 1 | Activity | Detail | 402000 | | Freight Revenue | -4,539,004.00 | USD | -4,539,004.00 | USD |
| 1 | Activity | Detail | 430000 | | Returns and Allowances | 63,870.00 | USD | 63,870.00 | USD |
| 1 | Activity | Detail | 500000 | | Cost of Goods Sold | 1,598,031.00 | USD | 1,598,031.00 | USD |
| 1 | Activity | Detail | 610000 | | Salaries & Wages | 2,509,333.00 | USD | 2,509,333.00 | USD |
| 1 | Activity | Detail | 620000 | | Advertising | 817,770.00 | USD | 817,770.00 | USD |
| 12 | Activity | Detail | 115100 | | ST Investments under 1 Yr | 2,559,900.00 | USD | 2,559,900.00 | USD |
| 12 | Activity | Detail | 122000 | | Prepaid Expenses | 410,763.11 | USD | 410,763.11 | USD |
| 12 | Activity | Detail | 124000 | | Accrued Facility Fees | 30,459.55 | USD | 30,459.55 | USD |
| 12 | Activity | Detail | 130000 | | Receiving/Inspection Inventory | 1,100,422.89 | USD | 1,100,422.89 | USD |
| 12 | Activity | Detail | 150000 | | Land | 11,000,000.12 | USD | 11,000,000.12 | USD |
| 12 | Activity | Detail | 151000 | | Buildings and Improvements | 1,000,000.00 | USD | 1,000,000.00 | USD |
| 12 | Activity | Detail | 153000 | 20000 | Furniture and Fixtures | 2,050,000.00 | USD | 2,050,000.00 | USD |
| 12 | Activity | Detail | 154000 | 20000 | Machinery and Equip | 19,000,000.65 | USD | 19,000,000.65 | USD |
| 12 | Activity | Detail | 155000 | 21000 | Automobiles | 520,789.00 | USD | 520,789.00 | USD |
| 12 | Activity | Detail | 156000 | 21000 | Computer Hardware | 21,067,884.75 | USD | 21,067,884.75 | USD |
| 12 | Activity | Detail | 157000 | 21100 | Construction in Progress | 1,100,990.23 | USD | 1,100,990.23 | USD |

FIG. 3N (prior art)

Ledger Inquiry

Ledger Summary

Before clicking on Detail hyper link, you can click on "Configure Ledger Chartfield Display" to display the chartfields that are pertinent to your inquiry.

Ledger Criteria

| Inquiry Name | Unit | Ledger | Fiscal Year | From Period | To Period | Currency | Stat |
|---|---|---|---|---|---|---|---|
| MYINQUIRY | US001 | LOCAL | 2001 | 1 | 13 | | |

☐ Show YTD Balance    ☐ Include Closing Adjustments
☐ Show Transaction Details    ☐ Only in Base Currency Max Ledger Rows: 100

Go To: Inquiry Criteria      Ledger Detail Drill-Down Chartfield Displa

Ledger Amount By Currency

| Period | Activity | Detail | Account | Dept | Account Description | PERIOD BALNCE (in transaction currency) | Currency | PERIOD BALANCE (in base currency) | Base Currency |
|---|---|---|---|---|---|---|---|---|---|
| 1 | Activity | Detail | 201000 | | A/P - GL Adj. | -450,000.00 | USD | -450,000.00 | USD |
| 1 | Activity | Detail | 402000 | | Freight Revenue | -4,539,004.00 | USD | -4,539,004.00 | USD |
| 1 | Activity | Detail | 430000 | | Returns and Allowances | 63,870.00 | USD | 63,870.00 | USD |
| 1 | Activity | Detail | 500000 | | Cost of Goods Sold | 1,598,031.00 | USD | 1,598,031.00 | USD |
| 1 | Activity | Detail | 610000 | | Salaries & Wages | 2,509,333.00 | USD | 2,509,333.00 | USD |
| 1 | Activity | Detail | 620000 | | Advertising | 817,770.00 | USD | 817,770.00 | USD |
| 12 | Activity | Detail | 115100 | | ST Investments under 1 Yr | 2,559,900.00 | USD | 2,559,900.00 | USD |
| 12 | Activity | Detail | 122000 | | Prepaid Expenses | 410,763.11 | USD | 410,763.11 | USD |
| 12 | Activity | Detail | 124000 | | Accrued Facility Fees | 30,459.55 | USD | 30,459.55 | USD |
| 12 | Activity | Detail | 130000 | | Receiving/Inspection Inventory | 1,100,422.89 | USD | 1,100,422.89 | USD |
| 12 | Activity | Detail | 150000 | | Land | 11,000,000.12 | USD | 11,000,000.12 | USD |
| 12 | Activity | Detail | 151000 | | Buildings and Improvements | 1,000,000.00 | USD | 1,000,000.00 | USD |
| 12 | Activity | Detail | 153000 | 20000 | Furniture and Fixtures | 2,050,000.00 | USD | 2,050,000.00 | USD |
| 12 | Activity | Detail | 154000 | 20000 | Machinery and Equip | 19,000,000.65 | USD | 19,000,000.65 | USD |

FIG. 30

| Unit: US001 | Journal ID: NEXT | Date: 03/09/2009 | *Process: | Edit Journal ▼ | Process |

Template List  Change Values

LINES

| Select | Line | *Unit | *Ledger | Account | Dept | Currency | Amount | Rate Type | Exchange Rate |
|---|---|---|---|---|---|---|---|---|---|
| ☐ | 1 | US001 🔍 | LOCAL | 🔍 100000 | 🔍 | 🔍 USD | | CRRNT 🔍 | 1.00000000 |

Look up Dept (Alt+5)

350

Lines to add: 1  [+] [−]  [▦]

| | Total Debits | Total Credits |
|---|---|---|
| | 0.00 | 0.00 |

TOTALS

| Unit | Total Lines | Journal Status |
|---|---|---|
| US001 | 1 | N |

[Save] [Notify] [Refresh]

Header | Lines | Totals | Errors | Approval

FIG. 3P

Look Up Dept

Look Up Dept

SetID:                    SHARE
Department: [begins with ▼] [_____]
Description: [begins with ▼] [_____]

[ Look Up ] [ Clear ] [ Cancel ]  Basic Lookup

Search Results
View 100                    First ◀ 1-6 of 6 ▶ Last

| Department | Description | Manager Name |
|---|---|---|
| 10000 | Human Resources | Ball,Nancy |
| 11000 | Information Services | Miller,Samuel |
| 12000 | Public Affairs | Miller,Samuel |
| 13000 | Finance | Bister,James |
| 14000 | Administration | Zak,Jill |
| 15000 | Business Services | Ellis,Hugh |

```
SELECT  SETID, DEPTID, DESCR, MANAGER_NAME
 FROM PS_SEC_DEPT_NB_UVW A
WHERE OPRID= 'VP1'
 AND PRODSRCID=' FGL' AND SETID=' SHARE'
 AND EFFDT= (SELECT MAX(B.EFFDT)
       FROM PS_SEC_DEPT_NB_UVW B  WHERE B.OPRID=A.OPRID
        AND B.PRODSRCID=A.PRODSRCID AND B.SETID=A.SETID
        AND B.DEPTID=A.DEPTID
        AND B.EFFDT<=TO_DATE('2009-03-17','YYYY-MM-DD'))
AND EFF_STATUS<>'I' ORDER BY SETID, DEPTID

PS_SEC_DEPT_NB_UVW:
      SELECT B.OPRID, B.PRODSRCID, A.SETID,  A.DEPTID,
      A.EFFDT, A.EFF_STATUS, A.DESCR, A.DESCRSHORT,
      A.MANAGER_NAME, A.ACCOUNTING_OWNER
       FROM PS_DEPT_TBL A, SEC_DEPT_USER B
      WHERE A.SETID = B.SETID
       AND A.DEPTID = B.DEPTID
       AND A.BUDGETARY_ONLY = 'N'
```

COMPUTER MEMORY

FIG. 3R (prior art)

Look Up Dept

SetID:                    SHARE
Department: [begins with ▼] [          ]
Description: [begins with ▼] [          ]

[Look Up] [Clear] [Cancel] Basic Lookup

Search Results
View 100                               First ◄ 1-153 of 153 ► La

| Department | Description | Manager Name |
|---|---|---|
| 1 | Department 1 | (blank) |
| 10000 | Human Resources | Ball,Nancy |
| 10200 | Headquarters | (blank) |
| 10500 | Benefits | Ford,Jane |
| 105000 | Benefits | Ford,Jane |
| 11000 | Information Services | Miller,Samuel |
| 12000 | Public Affairs | Miller,Samuel |
| 13000 | Finance | Bister,James |
| 14000 | Administration | Zak,Jill |
| 15000 | Business Services | Ellis,Hugh |
| 2 | Department 2 | (blank) |
| 20000 | Sales Administration | Martin,Jean-Patrick |
| 21000 | Eastern Sales Region | Lyons,Greg |
| 21100 | Central Sales Region | Gerhart,Ron |
| 21200 | Western Sales Region | Hoffman,Tania |
| 21300 | Northern Sales Region | Ng,Mary |
| 21400 | Southern Sales Region | Baker,Matt |

```
SELECT  SETID, DEPTID, DESCR, MANAGER_NAME
 FROM PS_DEPTID_NB_VW A
WHERE SETID= 'SHARE'
 AND EFFDT= (SELECT MAX(B.EFFDT)
       FROM PS_DEPTID_NB_VW B WHERE B.SETID=A.SETID
         AND B.DEPTID=A.DEPTID
         AND B.EFFDT<=TO_DATE('2009-03-17','YYYY-MM-DD'))
AND EFF_STATUS<>'I' ORDER BY SETID, DEPTID

PS_DEPTID_NB_VW:
      SELECT A.SETID, A.DEPTID, A.EFFDT, A.EFF_STATUS,
       A.DESCR,    A.DESCRSHORT, A.MANAGER_NAME,
       A.ACCOUNTING_OWNER
        FROM PS_DEPT_TBL A
         WHERE BUDGETARY_ONLY = 'N'
```

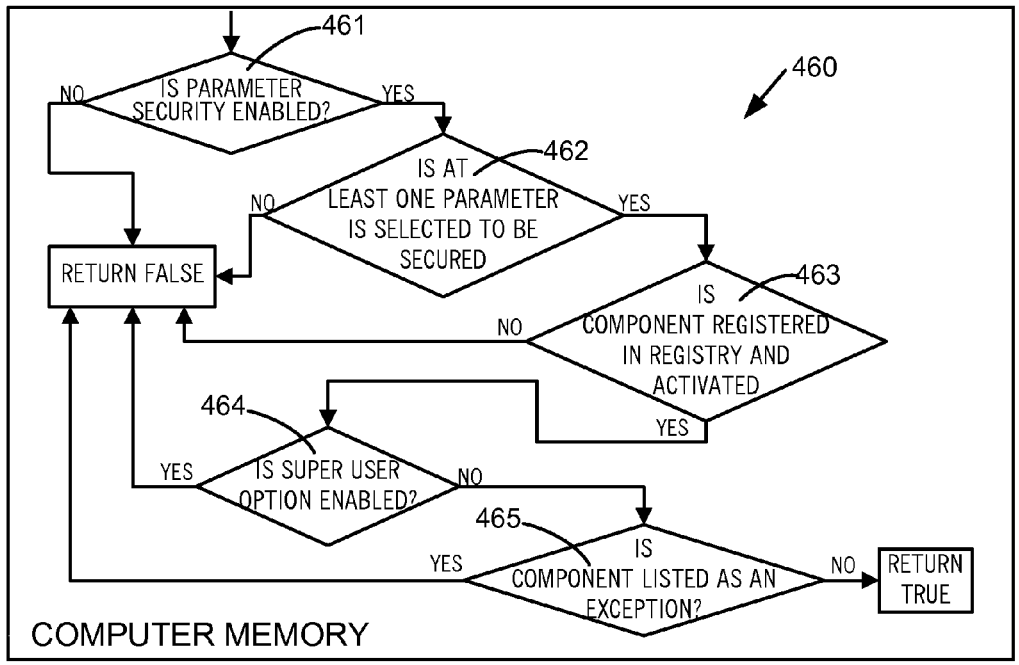

SECURING USER ACCESS TO A PARAMETER VALUE ACROSS A SOFTWARE PRODUCT LINE DIFFERENTLY FOR DIFFERENT PRODUCTS

BACKGROUND iProcurement, which is available from Oracle Corporation of Redwood Shores, Calif. is a self-service requisitioning software product that when executed in a computer enables an organization (such as an automobile manufacturer) to use computers to monitor and control spending by its employees. A computer which executes iProcurement enables employees to create, manage, and track their own orders for goods and services ("items") needed by the organization over a communications network (e.g. Internet), while the organization's purchasing department retains central control. In iProcurement, securing attributes, called realms can be set up to restrict a user's access to items identified in a catalog—either by item categories, or by punchout supplier sites. For details on securing attributes of iProcurement see pages 2-43, 3-64 to 3-73 of Oracle® iProcurement Implementation Guide, Release 11i, Part No. A85361-04, published August 2003, incorporated by reference herein as background.

Another example of prior art technology is row level security as implemented in a software product of the type shown in FIGS. 1A-1E and discussed next. Specifically, certain prior art computers known to the current inventors execute instructions to display a user interface (FIG. 1 A) that enables a human administrator to specify a type of security to be applied when any product in a product line, such as Peoplesoft Financials, available from Oracle Corporation, is used by other humans who are non-administrators, i.e. users. As shown in FIG. 1A, an administrator may specify that there are to be no security restrictions at all, resulting in every user of the product being allowed access to every screen in the product.

Alternatively, security may be enforced in the just-described Peoplesoft product based on an identifier of each individual user (shown as "User ID Level Security" in FIG. 1A) or based on a permission list (shown in FIG. 1A as "Permission List Level Security"). When either User ID Level Security or Permission List Level Security is selected by an administrator, a set of fields that can be secured during normal use of the product is presented to the administrator as shown in the bottom half of the screen in FIG. 1A (labeled "Secured Fields"). Prior art fields that can be secured are (a) Business Unit which represents an organization unit (comparable to a Set of Books in the E-Business Suite product line available from Oracle Corporation), (b) Setid which is a mechanism that controls groups of values for accounting codes called Chartfields, (c) Ledger which identifies specific accounting ledgers that may be accessed, (d) Book which represents a slice of accounting activity within a ledger, (e) Pay Cycle which refers to groups of vouchers or invoices scheduled for payment, and (f) Project which is typically identified by a unique project number, with a secondary option to define the project names/numbers by use of a list or a tree, already existing in the computer, as shown in the drop-down box.

FIG. 1B demonstrates an example of how a user's access to information related to various Business Units (FIG. 1A) is initially defined by the administrator, for all products in the Peoplesoft Financials product line. FIG. 1C shows an example setup, to allow a user named "VP1" access to a ledger named CC_FS_EXP. FIG. 1D is an example of how security for projects is set up when the option selected in the Security Options page is "Use tree". The selected projects displayed by the prior art computer to a user are the ones that are authorized for that user (e.g. VP1) when that user is assigned the role of Project Manager by an administrator. Once values have been defined and assigned to a user, a process needs to be executed by the computer, to build an appropriate dynamic view (FIG. 1E).

The just-described views (FIG. 1E) are used by multiple products in Peoplesoft Financials to restrict access to certain sets of data, based on security options defined by the administrator, e.g. on a Business Unit, Ledger or Project. Use of these views in the prior art (FIG. 1E) is by all products to internally secure data in such a way that when a user is logged in and using a product, search views used for prompting the user display only authorized values based on security options that were specified in common (FIG. 1B) for all products in the product line. In the example shown in FIG. 1B, a list of values that will be presented to user VP1 for selection in any product in Peoplesoft Financials only contains prompt values BUY01, BUY02, BUY03, BUY04, BUY05, BUY06, BUY07, BUY08 and US001 which the administrator has selected. Accordingly, in all products in Peoplesoft Financials, user VP1 is not able to view the prompt value of any other business unit (e.g. US002), and hence unable to select to view data for such other business unit. Similar behavior can be implemented using common security options, e.g. a Ledger defined for the user, as well as for Projects.

The current inventors note that certain prior art of the type illustrated in FIGS. 1A-1E does not permit securing a user's access to a parameter value differently in different components. For example, an accounts payable (AP) clerk may need access to all accounts and to all departments of an organization in one component, to enter an organization's vendor invoices. The current inventors note that if options are set up for the AP clerk to be granted access to all accounts and all departments, the only way to do so in the prior art known to the inventors automatically grants access in all components. On doing so in prior art software, the current inventors note that the AP clerk is automatically given the ability to place an order for any item in any account, and to charge it to any department, which is a breach in security. Hence, the current inventors believe there is need for improvement, of the type discussed below.

SUMMARY

One or more computer(s) are programmed in accordance with the invention to secure a user's access to one or more value(s) of a parameter differently for different software products, each of which uses the same parameter. In some embodiments, a computer is programmed to receive as input from an administrator, identification of one or more values of the parameter (e.g. an accounting code) that is commonly used by multiple products of software, and thereafter to store and/or retrieve information associated therewith (e.g. information about an accounting transaction), in a database. In addition, the just-described computer is further programmed to receive from the administrator at least two additional identifications, namely: (A) identification of one or more product (s) wherein the parameter value(s) is/are to be used to secure user access, and (B) identification of user(s) allowed to use the identified parameter value(s) in the identified product(s) to access any associated information in the database.

In response to receipt of the above-described three identifications, the computer automatically stores an association in a computer memory, relating each of the just-described three identifications, namely: (1) the parameter and its value(s) (2)

user(s) and (3) product(s) in which the identified user is to be allowed (or disallowed depending on the embodiment) access to the parameter value. In the just-described computer memory, all three identifications (1)-(3) are stored in association with one another (e.g. in a common row of a table). Hence, the just-described association is a tuple of three identifications, i.e. a 3-tuple. Formation of such a 3-tuple association is also referred to herein as a "rule assignment." Moreover, the above-described identification (1), namely the parameter and its value(s), is also referred to below as a "rule", and sometimes more specifically as a "parameter-security rule".

During operation, the above-described computer automatically uses one or more such 3-tuple associations (i.e. rule assignments) on each subsequent receipt of input data and/or command from a user, to identify and retrieve one or more parameter-security rule(s) from computer memory, based on the identity of the user, and also based on an identity of the product or component to be operated by the user. The above-described computer then automatically applies the parameter-security rule(s) to retrieve from a storage device (such as a hard disk), certain information ("authorized information") that is a subset selected based on (A) at least the parameter value(s) previously specified by the administrator in the parameter-security rule(s), and (B) responsive to the user's input data, from among all information in the database otherwise accessible to the computer.

Thereafter, the computer executes whichever software product the user had invoked when supplying input data, so as to generate for display to that user, output data ("results") based on processing the subset of authorized information, while excluding another subset of information ("unauthorized information") which is also accessible to the computer but excluded by application of the parameter-security rule to the identified user when invoking the identified product. Hence, only result(s) based on authorized information are generated and held in computer memory, and eventually displayed to the user, who is thereby denied access to unauthorized information, depending on each of: the product's identity, the user's identity, and the parameter's value (i.e. the 3-tuple association).

Therefore, computers in several embodiments of the invention enforce one or more rule(s) on a parameter's value and specific to an individual user and also specific to a product being invoked by that user. In some embodiments, such a computer is further programmed to apply the rule(s) when receiving the user's input data through a user interface, e.g. by displaying a list of only those values that have been authorized for that user when using that product, thereby to enable the user to only select therefrom e.g. by clicking a button of a computer mouse. Although the above description refers to a software product, other embodiments in accordance with the invention form and use 3-tuple associations with individual components included within one or more software products.

BRIEF DESCRIPTION OF THE FIGURES

FIGS. 1A-1E illustrate, in screens of a graphical user interface, use of realms by some software products of the prior art.

FIGS. 2B-2H and 2J-2S illustrate administration screens of a graphical user interface displayed by a computer programmed to perform the method of FIG. 2A in several embodiments of the invention.

FIG. 2I illustrates a table 232 identifying associations between rules, users and products and another table 240 defining the rules both tables being stored in a memory 1106 of the computer of FIGS. 2A-2S in some embodiments of the invention.

FIGS. 3B-3M and 3O-3Q illustrate, user screens of the graphical user interface displayed by the computer programmed to perform the method of FIGS. 2A and 3A in several embodiments of the invention.

FIGS. 3N, 3R and 3S illustrates, screens of a prior art computer.

FIGS. 4A-4G and 4J illustrate, in high-level flow charts, methods for implementing various acts performed by the computer of FIGS. 2A and 3A in some embodiments of the invention.

DETAILED DESCRIPTION

Figures 2A, 3T:
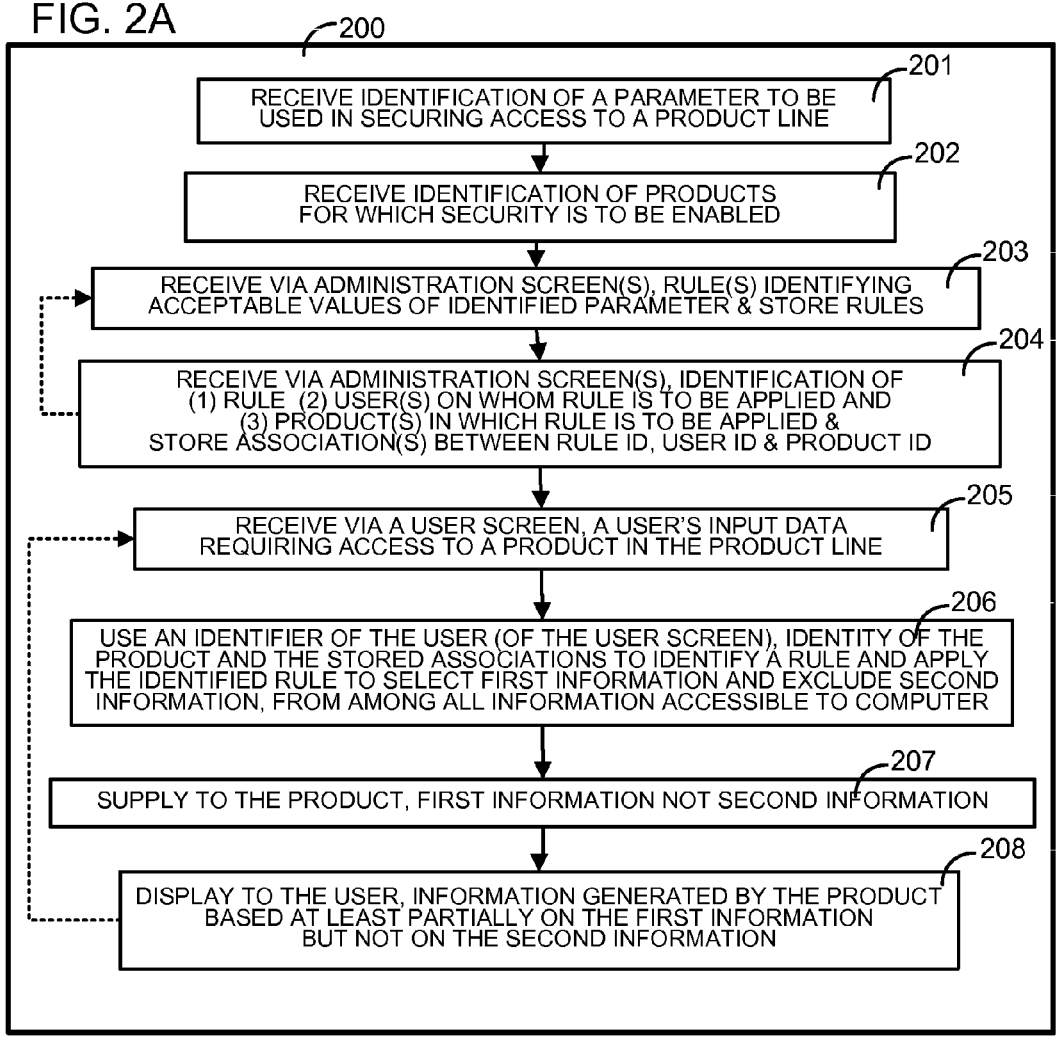
FIG. 2A illustrates, in a high-level flow chart, acts performed by a computer programmed in accordance with the invention to interact with an administrator to receive information to secure access via rules specific to both a user and a product.
FIG. 3T illustrates metadata in a table structure ("detail record") in a computer memory of a computer in some embodiments of the invention.

The term "software product line" is used herein to denote software supplied by a single vendor (such as Oracle Corporation), as a group of products that can execute independently of one another, and therefore each product is available for purchase individually. The just-described products in a software product line typically have a graphical user interface (GUI), including screens that are displayed to a user on a video monitor of a computer that executes instructions in one or more products in the group. The GUI screens of products in the group typically include one or more user interface features that are commonly supported by most of (i.e. greater than 50% of) the products in the group. Common user interface features are typically selected by the vendor to present a uniform appearance of GUI screens to the user (via the video monitor) across multiple products, so that a user's skill that has been developed by operating one product in the group can be easily transferred to operation of another product in the group.

Depending on a customer's need, a customer may buy one or more products individually from the vendor or the customer may buy all products in a product line (of software). Each product in turn may contain one or more components, and a component may be included in multiple products. However, a customer may not buy a single component, or even multiple components individually and instead the customer must buy a product as a whole (including one or more components as portions thereof), and the product in turn is one of multiple products in a product line of software for execution by a computer.

One example of a software product line is 2007 Microsoft Office available from Microsoft Corporation, which includes the following products: Office Word 2007, Office Excel 2007, Office PowerPoint 2007, Office Outlook 2007, and Office Access 2007. Most of the just-described products from Microsoft Corporation have several user interface features in common, such as (1) an "Office" button which is displayed in the top left corner of the user interface, and (2) a "Help" button which is displayed as a question-mark enclosed in a circle in the second row at the upper right corner of the user interface. Note that a single software product, such as Office Outlook 2007, may itself include several components, such as Calendar, Contacts and Mail.

Another example of a software product line is Oracle Financials available from Oracle Corporation, which includes the following accounting software products: Assets, Cash Management, Accounts Payables, Accounts Receivable, General Ledger, Payments, Payables, and Receivables. Yet another example of a software product line is PeopleSoft Financials available from Oracle Corporation which includes the following products: Asset Management (FAM), Accounts Payable (FAP), Accounts Receivable (FAR), Contracts (FCA), eProcurement (DPV), Services Procurement (DSP), Travel and Expense (FEX), Billing (DBI), Cost Management (DCM), Inventory (DIN), Order Management (DOM), General Ledger (FGL), Treasury (FFTR), Commitment Control (FGL), Project Costing (FPC), Purchasing (DPO), Grants Management (FGM), and Work Order Management (FWO).

Referring to FIG. 2A, a computer 200 is programmed in accordance with the invention to receive, via an administration screen in a graphical user interface (GUI), identification of a parameter that is to be used to store and/or retrieve information associated therewith, by multiple software products in a product line of software as per act 201 (FIG. 2A). Note that the administration screens are common to all products in the product line of software in accordance with the invention. The parameter identified in act 201 is stored in the memory of computer 200 for future use in defining and applying parameter-security rule(s) as discussed below in reference to FIG. 2A. The parameter identified in act 201 can be, for example, a name of a feature commonly used by multiple products that edit files in a personal computer (PC), e.g. products in the product line 2007 Microsoft Office described above. As another example, the parameter identified in act 201 can be a department of an organization commonly used by multiple products in storing and retrieving information on daily transactions of that organization, e.g. products in the product line PeopleSoft Financials.

Additionally, in act 202 computer 200 receives, e.g. via an administration screen, identification of one or more software products in the software product line, on which parameter security is to be active, i.e. in which one or more parameter-security rule(s) are to be applied. Note that act 202 can be performed before act 201, in alternative embodiments.

And, in act 203, computer 200 receives via an administration screen, identification of one or more values for the parameter (identified in act 201) that the administrator identifies as being accessible to user(s) (e.g. who may be identified in a second screen), when applying parameter-security rule(s) in specific products (e.g. which may be identified in the second screen) of a product line. For illustration of the screens used to receive a parameter-security rule, see FIGS. 2F and 2J which are described below. In act 203, the administrator-supplied value(s) and an identity of the parameter are stored in a table 240 in the computer's memory 1106 (FIG. 2I), for future use as parameter-security rule(s), as discussed below.

Note that definition of a parameter-security rule in table 240 enables the administrator to create a rule just once and then apply that newly-created rule multiple times, to different combinations of specific product(s) and specific user(s) as described next, e.g. as illustrated by an example of the second screen shown in FIG. 2G. Specifically, in act 204 computer 200 receives, e.g. via one or more administration screens, identification of a parameter-security rule (selected from among the rules received in act 203), an identifier of a user on whom the rule is to be enforced, and an identity of a product (selected from among products identified in act 202), to which the rule is to be applied. In act 204, computer 200 stores in computer memory 1106, an association between the identified user, the identified product and the identified rule(s), e.g. as shown by table 232 for associations (i.e. rule assignments) and table 240 for rule definitions as illustrated by FIG. 2I, and discussed below.

Although acts 201-204 have been described in some examples above as receiving information via one or more administration screens of a GUI, in other examples such information may be received in other ways, e.g. in a file transmitted by another computer, with information therein being entered through a text editor. One or more of acts 201-204 may be repeated as necessary in a given embodiment of the invention and/or these acts may be performed in different order relative to one another depending on the embodiment. Hence, acts 201-204 may even be performed at about the same time, e.g. via a single screen in an alternative embodiment. In one embodiment, after act 204 is performed, computer 200 returns to act 203 to receive additional parameter-security rule(s).

After one or more associations (i.e. rule assignments) are stored in memory 1106 of computer 200 as described above in reference to acts 201-204 (FIG. 2A), computer 200 receives, e.g. via a user screen of the GUI, input data (e.g. a query) from a user who requires access to one or more products in the product line, in act 205. In response, computer 200 uses an identifier of the user, an identity of the product, and the associations in table 232, to retrieve from table 240 in memory 1106, one or more parameter-security rule(s) previously specified by an administrator in act 203. The retrieved parameter-security rule(s) is/are then applied by computer 200 performing act 206, to select a subset of information ("first information") and exclude another subset of information ("second information") from among all information that is responsive to the user's input data (e.g. query), for use by products in the product line. For example, if a parameter-security rule (identified by use of a stored association) specifies that an acceptable value for a parameter named "department" is the value "manufacturing" then this rule is used in act 206, to select only manufacturing-related journal entries (as the first information), and to exclude other journal entries such as a journal entries for repair service (as the second information), from among all journal entries dated within a date range identified by the user, when using a specific product in the product line.

After act 206, computer 200 performs act 207 wherein the first information is supplied to the identified product to enable computer 200 to generate a display for the identified user, and the second information is not supplied to the identified product. Hence, the identified product itself is then executed by computer 200, using the first information to generate information (i.e. results) which are now displayed to the identified user, as per act 208, e.g. on a video monitor of computer 200. Note that the generated information (which is displayed) is based at least partially on the first information. For example, first information that is retrieved and supplied to a product in acts 206-207 may be manufacturing-related checks within the user-specified date range, while the information generated by the product in act 208 may be a total dollar amount of money spent in the manufacturing-related checks obtained by summation thereof. Thus, generated information that is displayed to the user in a specific product is not based on any second information (e.g. a repair-service check) that is explicitly excluded by use of a parameter-security rule in performing a database retrieval operation in act 206 (via a database management system 1905 shown in FIG. 5B). After review of the generated information displayed by a specific product on a video monitor of computer 200, the user may provide additional input to the specific product in which case computer 200 returns to act 205 (described above).

Accordingly, per acts 205-208, an identified user may use a product identified in an association in table 232 to view and modify only first information to which the identified user is granted access by computer 200 applying one or more parameter-security rule(s) associated therewith. Specifically, use of a parameter-security rule that is associated with both an identified user and an identified product as described above enables a product line in an appropriately programmed computer 200 to limit a user's access to only the first information specifically identified as being accessible to the user in a specific product. The parameter-security rule(s) may be applied in computer 200 by software in a product line at different levels, e.g. depending on the product and/or attributes of the user, and yet do so in a consistent manner across multiple products in the product line.

In an example in accordance with the invention, one rule is used by computer 200 to provide a user (e.g. AP clerk) with full access in one product, e.g. to enter an invoice for any department's account in an organization, and another rule is used by computer 200 to provide that same user (e.g. John Doe who works as an AP clerk) with limited access in another product, e.g. to enter a procurement for themselves only using a preselected account. To restate this example, John Doe the AP clerk is enabled by a first rule in computer 200 to enter invoices for all departments in the entire organization in the product Payables. However, John Doe the AP clerk is also limited by computer 200 applying a second rule that identifies only a preselected department to which an order of supplies (e.g. pencils) can be charged in the product eProcurement. Hence, two different rules are used by computer 200 in securing user access to a value of the same parameter "department" differently for two different products, e.g. in the PeopleSoft Financials product line, namely the product Payables and the product eProcurement.

In some embodiments, a parameter which is secured by defining a rule in act 203 is an accounting code (or a portion thereof) that is typically used in common by multiple products in an accounting product line, to store into and/or to retrieve from database 1110, multiple financial transactions that are recorded therein, e.g. as business records created periodically (e.g. daily or monthly) in an organization, such as an automobile manufacturer. Common examples of parameters whose names and values are shared by different products and secured differently in each product in several embodiments of the invention are names of accounting codes (and values thereof) for an accounting software product line. The accounting code names in one such accounting software product line, when set up by an administrator, and can include, for example, the following names: "account" (to identify the type of transaction, e.g. expense or revenue), "department" (to identify an entity within the organization that is affected by the transaction), "fund" (to identify where money for the transaction comes from), "project" (to identify what the money is being spent on), "budget reference" (e.g. year to identify which accounting period is affected), and "class" (to identify what the money is being used for), etc. In such an accounting software product line, depending on the organization's structure and needs, the administrator may additionally set up one or more other parameters, e.g. with the name "sub-account" (to identify more detail on the type of transaction, e.g. a recurring expense or an inventory expense).

Hence, parameters whose values are secured by parameter-security rule(s) as described herein can be, for example, accounting codes in a product line of accounting software that may be known by other names to a programmer skilled in preparation of accounting software. For example, e.g. a parameter may be known as a fund source or a fund code instead of simply "fund", while another parameter may be known as a company code or a cost center instead of department, etc. The specific accounting codes and/or other parameters that are to be used to characterize a financial transaction and in some embodiments of the invention to limit a user's access to information associated therewith, may be custom defined by the organization.

In some embodiments of the invention, parameter-security rule(s) are defined on parameters that are accounting codes called "ChartFields" in the PeopleSoft Financials product line of accounting software, available from Oracle Corporation of Redwood Shores, Calif., USA. Specifically, each of several products in the product line PeopleSoft Financials supports security at the level of individual values of certain parameters that are accounting codes, called "ChartFields." Although the following description refers to ChartFields, as noted above, other embodiments may implement parameter-security rules for other parameters that are commonly used by multiple products in a product line. For example, an alternative embodiment implements such parameter-security rules on accounting codes that are known by other names in other accounting software, such as "segments" of a "flexfield" in a product line called Oracle Financials, also available from Oracle Corporation.

Also, values which are secured by application of a rule may be either numeric or alphanumeric or any character string, depending on the embodiment. One illustrative embodiment uses chartfields as parameters, and accepts any character string as the value thereof. In some embodiments, a combination of values, of all accounting codes in a transaction, represents a cost center against which a fiscal activity is recorded by input of data on the transaction into computer 200, which records the data in database 1110. Data from database 1110 may be transferred to/from computer memory 1106 by a database management system 1905. Memory 1106 may be volatile or nonvolatile, depending on the embodiment and database 1110 may be stored in a storage device such as an optical disk or a magnetic disk.

In an example of an administration screen 209 illustrated in FIG. 2B, two accounting codes, namely "Account" and "Department" have been selected by administrator 210 (e.g. by clicking on a mouse). These selections of accounting codes are received in act 201 by computer 200, and they are used in setting up rules to enable and/or disallow access to financial data by certain specified users of computer 200, as discussed in reference below to FIG. 2F. Referring to FIG. 2B, some embodiments of computer 200 receive from administrator 210, selection of a security method in a portion 209A of screen 209, based on (a) an identifier of a user, (b) a role that may in turn be assigned to one or more identified users, and (c) a permission list that may be associated with one or more identified users.

Specifically, if administrator 210 chooses User ID as a security method to be performed by computer 200, in a screen portion 209A (FIG. 2B), then one or more rules are associated directly with an individual user who is identified by the administrator, when assigning each rule. If the administrator chooses roles as a security method to be performed by computer 200, the administrator can assign a rule to user(s) of a given product, based on the role each user plays in an organization. A role-based security method performed by computer 200 enables an administrator to associate a rule (i.e. assign the rule, for a given product) en masse, e.g. by associating large groups of users (who have the same role, e.g. manager) with the same rule. Finally, an administrator 210 can use special permission lists created and assigned to users, to cause computer 200 to associate users who are identified by the permission lists with one or more rules.

Note that screen 209 of computer 200 includes two tabs, namely a "Secured Fields" tab 213 which when selected displays (as shown in FIG. 2B) accounting codes 213A being secured, and a "Security Records" tab 214 which when selected displays names of tables (also called "records") in computer memory that are associated with each accounting code, as shown in FIG. 2C. Each of accounting code 213A (FIG. 2B) that is enabled for use in a rule is associated by computer 200 with a table ("record") for each of the supported methods: (a) User's identity (b) User's Role; and (c) Users identified in a Permission List. An administrator 210 wishing to add a new accounting code to computer 200 creates new tables ("records") that correspond to the new accounting codes.

FIG. 2C illustrates parameter 251 named "Account" for which computer 200 has in its computer memory, a table ("security record") 252 named "SEC_ACCT_USER". This table 252 holds one or more rule assignments identifying to computer 200, one or more user-accessible values of parameter 251, for each user and for each product. Examples of such values are shown in FIG. 2O for a similar table 257 (FIG. 2C) that is named "SEC_DEPT_USER." As shown in FIG. 2O, table 257 (also called a "security record") holds all the accessible values of a specific parameter namely "Department" for each user (FIG. 2O illustrates only the values for a single user, namely VP1) and for each product in the PeopleSoft Financials product line. Table 257 illustrated in FIG. 2O shows that user VP1 is allowed to access each of values 10000, 11000, 12000, 13000, 14000 and 15000 for the parameter Department, when using the software product Expenses. To summarize, computer memory 1106 holds at least one table 257 that identifies user accessible values of a specific parameter, for each combination of a specific user and a specific product.

Moreover, as shown in the example of FIG. 2O, user VP1 is further allowed by computer 200 to access these same values for this same parameter in the product General Ledger. In some embodiments, a parameter's user-accessible values that are stored in SEC_DEPT_USER table 257 in computer memory 1106 are initially specified in a summary manner by an administrator, e.g. as a range of values as illustrated in row 233 of FIG. 2J. The just-described specification by the administrator is initially stored in various tables, such as tables 232 and 240 in FIG. 2I, and these tables are subsequently used as input to a batch job that is executed during off-peak hours (e.g. each day at mid-night). The batch job compiles the rules that have been specified by the administrator in a summary manner, in order to generate individual values (in some embodiments for each combination of a specific user and a specific product), and the generated values are stored in table 257 ("security record") to be used during normal execution of computer 200 (e.g. during peak hours). Use of a batch job by computer 200 mitigates online performance problems that would otherwise arise if the same compilation is done during normal operation.

Figure 2D:
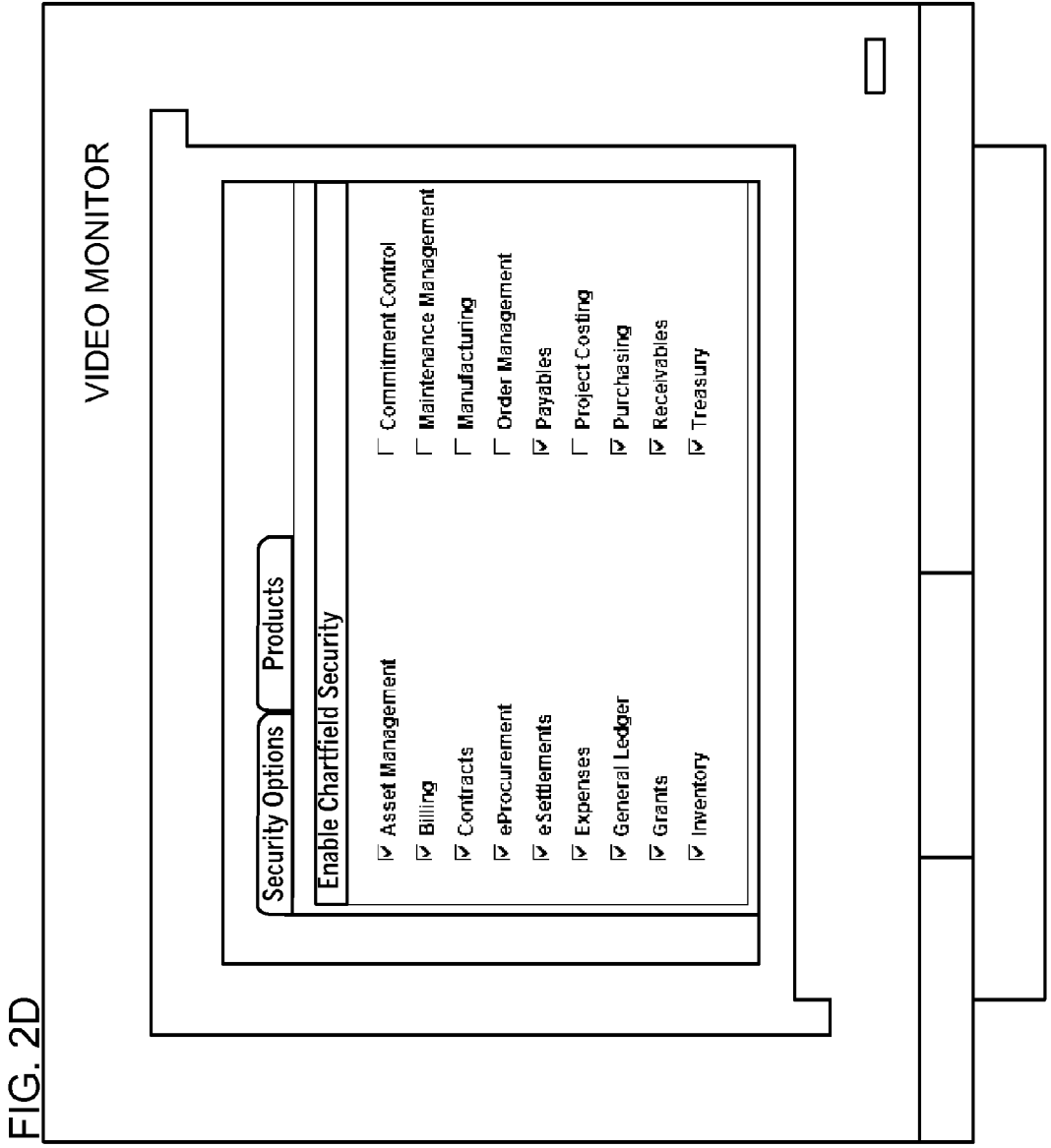
Figure 2F:
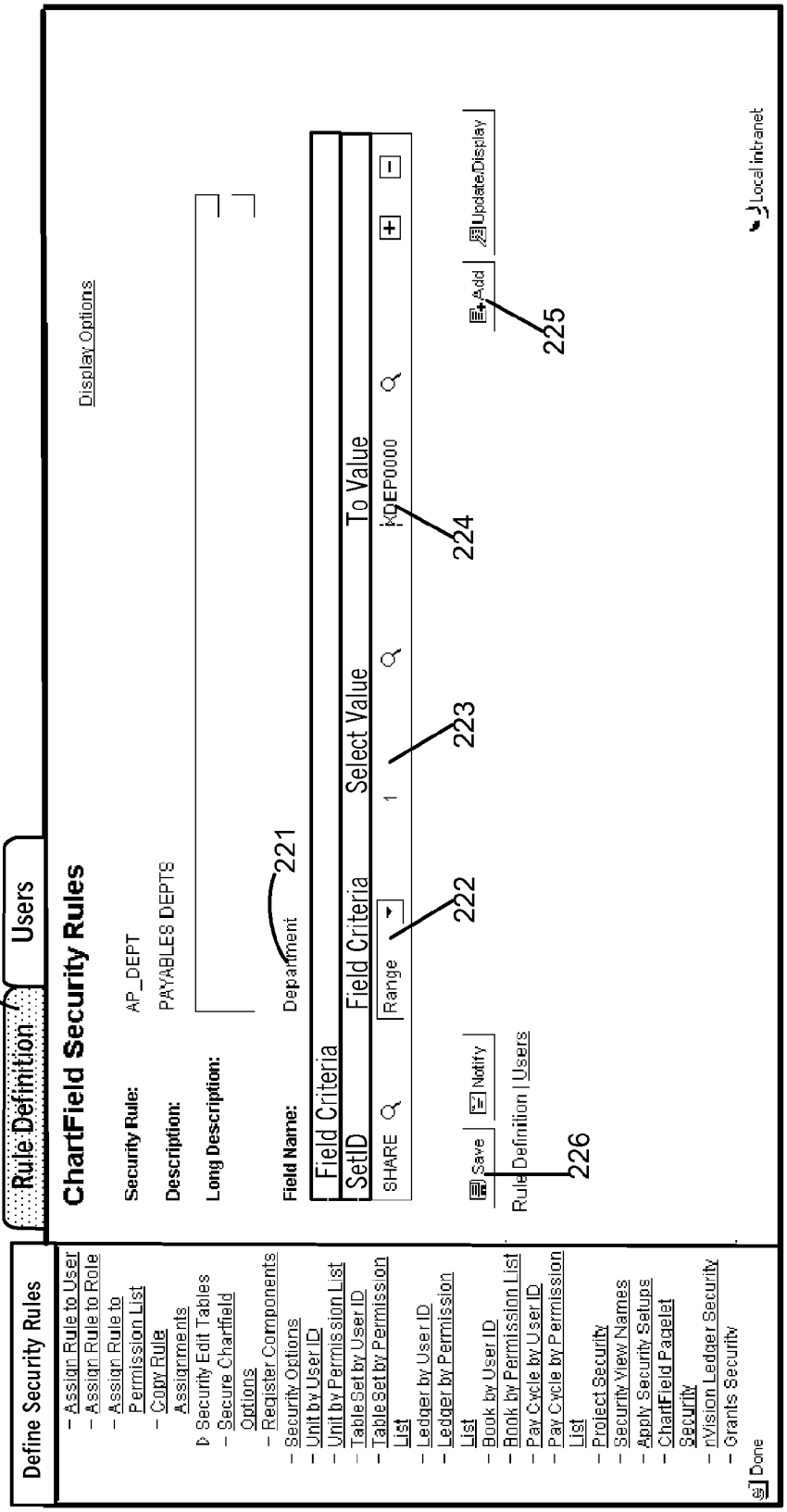
Figure 2G:
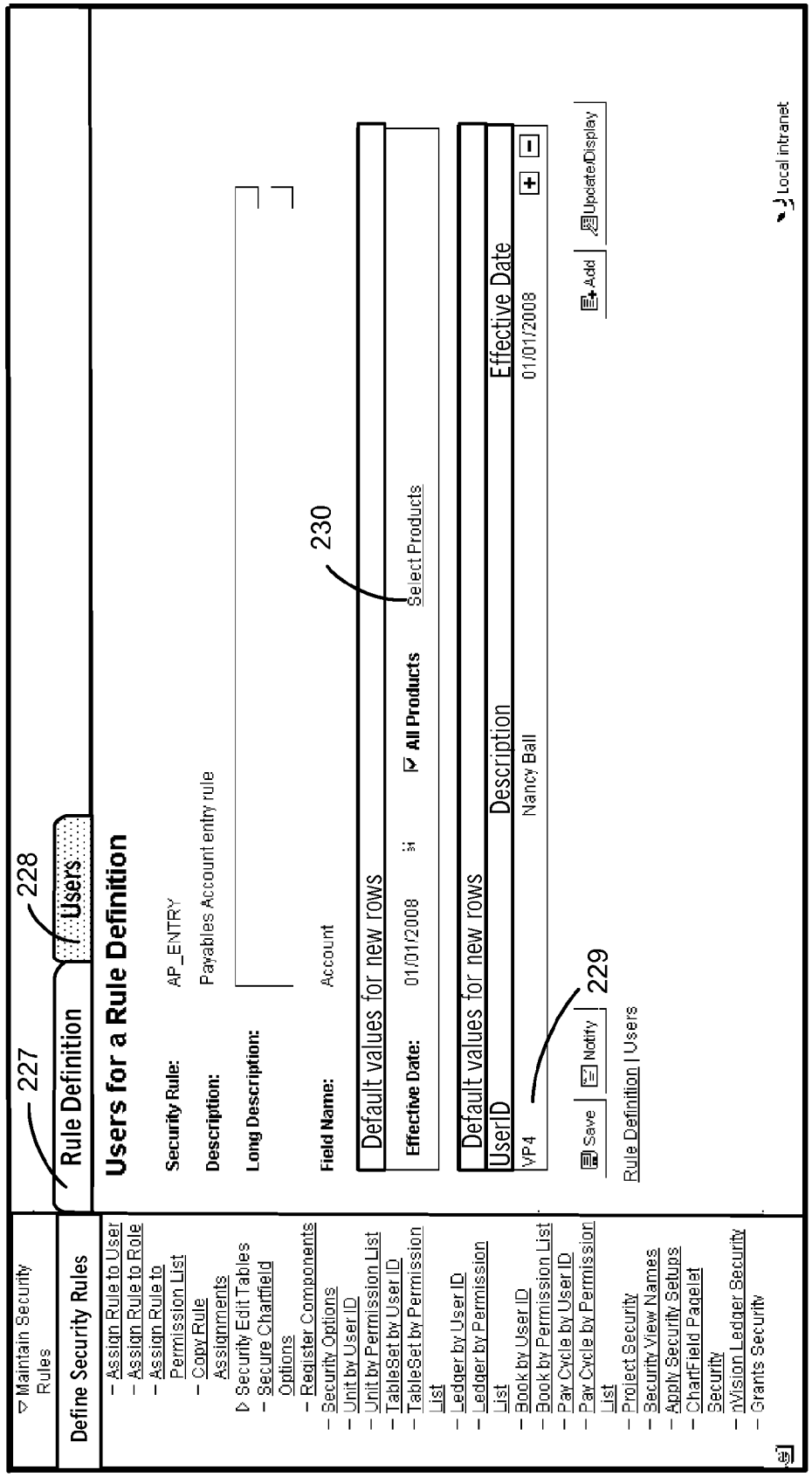
Figure 2H:
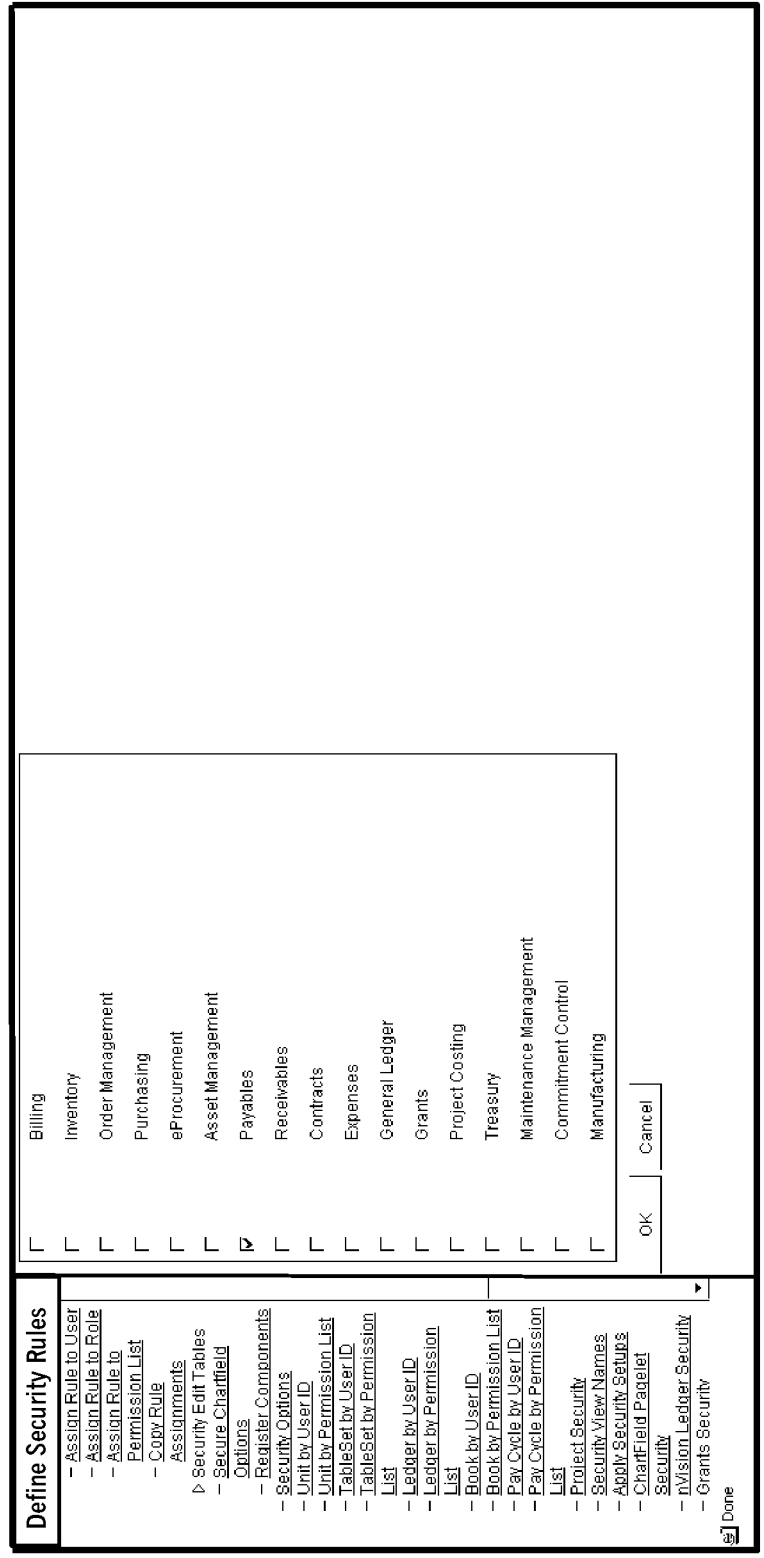
Figure 2J:
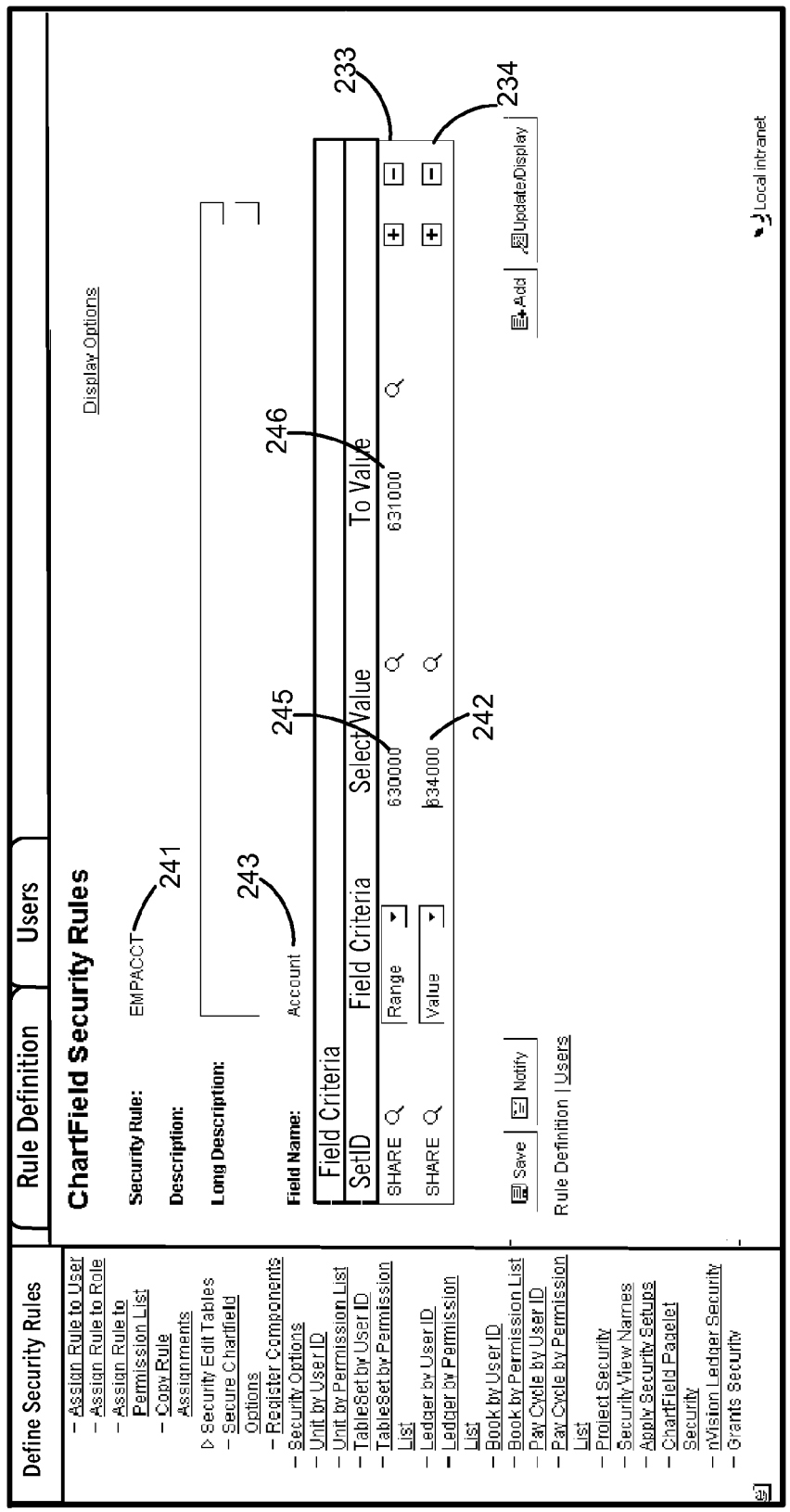

Accordingly, a batch job is run by computer 200 to identify and store in SEC_ACCT_USER table 252, individual values for the parameter ACCOUNT illustrated in FIG. 2J, for each assignment of this rule specified by the administrator, namely for each individual product and for each individual user. The programming of such a batch job is readily apparent to the skilled artisan in view of this disclosure. Alternative embodiments do not use a batch job, and instead computer 200 updates the SEC_ACCT_USER table 252 immediately in response to an instruction from the administrator although as noted above these alternative embodiments degrade online performance of the product line of software.

In some embodiments, there is one row in SEC_DEPT_USER table 257, for each row shown in FIG. 2O. Note that a "blank" value 291 illustrated in FIG. 2O is used in some embodiments to match to a default uninitialized value for the parameter, e.g. the space character " ". Hence in FIG. 2O, the user VP1 is permitted to access any value for the parameter Department when using the product Manufacturing (as per the blank value 291) and the product Order Management (as per the blank value 292). As noted elsewhere herein, the user-accessible values of a parameter are used in some embodiments whenever one or more products in the product line PeopleSoft Financials store data in and/or retrieve data from database 1110 (FIG. 5B). Hence, the screen shown in FIG. 2O enables changes to user-accessible values of a parameter held in the SEC_DEPT_USER table 257, e.g. in response to an administrator clicking on a magnifying lens icon 253 (FIG. 2C) that is displayed adjacent to the name of a table 252.

Note that in FIG. 2C, a row which displays the name of a parameter 251 also displays the names of additional security records, for example security record 254 named "SEC_ACCT_ROLE" which is applicable to all users having a specified role, and security record 255 named "SEC_ACCT_PERM" which is applicable to all user identified on a permission list. The parameter-security rules for roles and permission lists are defined and used in a manner similar or identical to parameter-security rules for users. Note that in the embodiment illustrated in FIG. 2C, only two parameters are shown secured from unauthorized access, specifically parameter 251 named "Account" and parameter 256 named "Department", although in other embodiments other parameters may be secured in a similar manner by setting up and using similar security records (or tables).

Referring to FIG. 2A, in act 202 computer 200 receives from administrator 210, identification of one or more products of a product line for which security is to be enabled via one or more rules based on parameters such as accounting codes (e.g. as specified in security records illustrated in FIG. 2C). For example computer 200 displays a screen (FIG. 2D) which identifies by name several accounting products (of the type described above) that are included in a product line being executed by computer 200.

Note that screens of the type shown in FIG. 2D may be implemented in certain embodiments that are based on a client-server architecture, as web pages (e.g. expressed in a markup language, such as HTML) that are displayable to administrator 210 via a web browser, such as Internet Explorer or Firefox. In the just-described embodiments, computer 200 is implemented as a server computer that generates the web pages which are transmitted over an electronic network (such as the Internet) to a client computer (such as a laptop) that displays the web pages on a video monitor to administrator 210.

In the example illustrated in FIG. 2D, administrator 210 has manually enabled security (e.g. by clicking on a mouse or operating a keyboard) for almost all products displayed in the screen, except for "Commitment Control". For example, the administrator checked the boxes for (and thereby enabled parameter-security for) the following products: Asset Management, Billing, Contracts, eProcurement, eSettlements, Expenses, General Ledger, Grants, Inventory, Payables, Purchasing, Receivables and Treasury. In this example, the administrator has unchecked the boxes for (and thereby disabled parameter-security for) Commitment Control, Maintenance Management, Manufacturing, Order Management and Project Costing. Hence, the products of a product line that are selected by the administrator in the screen of FIG. 2D are those for which user access to parameter values is secured, as discussed herein.

When administrator 210 excludes a product (e.g. "Commitment Control") from being secured, many embodiments of the invention enable the users to access all data in database 1110 when using the excluded product, without regard to parameter-security rules. In such embodiments, enabling one product in a product line for security at the level of a parameter's values, while not enabling another product in that product line for this same parameter-security may create a vulnerability (also called "security hole") as follows. A user who is denied access by computer 200 to a given component in a product that is secured with parameter-security rule(s) may be able to navigate to that same given component from another product which is disabled for this security, e.g. if the two products share the given component. This issue is addressed in some embodiments by assigning each component to only one product as an owner (also called "source product"), as shown in FIG. 2E, and each component's security is enforced based only on security rules applicable to the component's owner regardless of which product uses each component.

More specifically, in a screen display of a component registry illustrated in FIG. 2E, a component JOURNAL_OPEN_ITEMS is shown as belonging to the product "General Ledger." By clicking on the drop down box for the source product, an administrator can select a different product to which the component is to belong. Accordingly, some embodiments provide an administrator with the ability (via an administration screen in the GUI as illustrated in FIG. 2E), to change a product to which a component belongs, e.g. to change a screen (and related software, i.e. "component") from being part of one product "General Ledger" to being part of another product (e.g. "Commitment Control"). As will be apparent from FIG. 2E, a component of a parameter-security disabled product may have its owner (i.e. source product) changed by an administrator, to the identity of another product that is enabled for parameter-security, and vice versa which creates a hole in parameter-security as follows.

The just-described hole arises in some embodiments wherein computer 200 determines whether a component is activated for security based on ownership of the component. Specifically, computer 200 uses a table (called "header record") for a product to retrieve the parameter-security rule value(s) to be applied when executing each component owned by the product. The header record typically holds high-level attributes that are commonly used by multiple screens of a component, e.g. the Journal header record includes Journal ID, Journal Date, Accounting Date, User ID, Currency, etc. In addition to such attributes, the header record typically also holds multiple keys that can be used to look up data used in the component. Examples of header records for components owned by the product General Ledger are illustrated in FIG. 2P as follows: JRNL_LN_FS is a header record for component JGEN_ACCTG_DRILL, JRNL_HEADER is the header record for component JOURNAL_ENTRY_IE, JRNL_LN_FS is the header record for component JOURNAL_FS, INQ_CRIT_TBL is the header record for component JOURNAL_INQUIRY, and so on.

A "Detail" hyperlink located at the far right of each row in FIG. 2P enables an administrator to access one or more additional tables ("detail records") illustrated in FIG. 2Q. The additional table(s) hold low-level attributes that are used in a portion of a component, such as a table displayed within a screen that displays multiple tables. In an illustrative example shown in FIG. 2Q, component JGEN_ACCTG_DRILL has two detail records: JGEN_ACCT_DRILL and JRNL_LN_FS. Accordingly, a component in computer 200 can have multiple detail records that contain sensitive data that needs to be secured, and these detail records are in addition to a header record that holds attributes commonly used throughout the component. In some embodiments, a header record in computer 200 includes identifiers of detail records as well as one or more keys used to look up the detail records.

Although not shown in FIG. 2Q, in some embodiments, each row includes an identifier of a table ("prompt edit table") that is used in a component's screen(s) to receive user selection(s) of parameter value(s). In such embodiments, the prompt edit table is used by computer 200 to display to the user only those parameter value(s) (e.g. in a "prompt list") that the user is authorized to access. Use of prompt edit tables by computer 200 of these embodiments prevents the user from entering a value that is not accessible to the user in the current product. An administrator may set a blank value for the prompt edit table to indicate to computer 200 that the component does not use a prompt edit table or does not need to secure any values. For example, a component may have read-only screens that do not allow any user to change or add parameter values.

In each of FIGS. 2P and 2Q, each row has an active flag that can be checked or unchecked by an administrator. Specifically, an administrator can uncheck an active flag to disable security for information accessed using the table identified in the row (e.g. a header record or a detail record respectively for FIGS. 2P and 2Q). Hence, administrators have the option to enable or disable security at the level of each component (FIG. 2P), and even at the level of individual detailed portions within a component (FIG. 2Q).

In one illustrative embodiment, a component called Requisitions in Peoplesoft Financials product line is owned by (i.e. belongs to) a software product called eProcurement and the same Requisitions component is also used in another software product called Purchasing. Hence, in this embodiment, if the administrator activates the Purchasing product for security at the level of parameter value, but if eProcurement software product is not activated for such parameter-security, then the Requisitions component is parameter secured when a user is using the Purchasing product but this same component is not secured at the level of parameter value when the user is using the eProcurement product, resulting in a security hole.

To overcome the just-described security hole, computer 200 is programmed in certain embodiments, for products that share components, to display to the administrator, names of the shared components (e.g. in documentation, and/or a pop-up message displayed by the screen of FIG. 2D which accepts the identity of products to be secured). Hence, in the certain embodiments, administrator 210 is made aware of the security hole that may arise from inconsistently securing products in a product line that share a component. Note that an administrator 210 can eliminate this issue by selection of all products to be parameter-secured in screen of FIG. 2D or alternatively by selectively assigning components of a disabled product as belonging to a product that is enabled for parameter-security as described above in reference to FIG. 2A.

For each product selected in the screen of FIG. 2D, the administrator defines one or more parameter-security rules and assign the rules to user id, role, or permission list for that product, as described below in reference to FIG. 2F. Failure of an administrator to define a rule for acceptable values for a parameter that has been secured in an identified product for an identified user results in computer 200 of some embodiments denying the identified user access to any information via the identified product's components, e.g. the user is unable to enter or view any financial transactions that are filtered out by application of all values of the parameter. The administrator's enabling of parameter-security for a specific product in FIG. 2D results in administrator-specified values for the parameter being used as portions of a database query by computer 200 when storing and/or retrieving data from database 1110 in some embodiments of the invention.

Note that the above-described actions of computer 200 as illustrated in FIGS. 2B-2D are optional and not performed in alternative embodiments. In one such alternative embodiment, there is no receipt of the administrator input via the screens of FIGS. 2B-2D and instead all the information is pre-programmed into the accounting software (e.g. by hard-coding) which is being executed by computer 200.

Figure 2L:
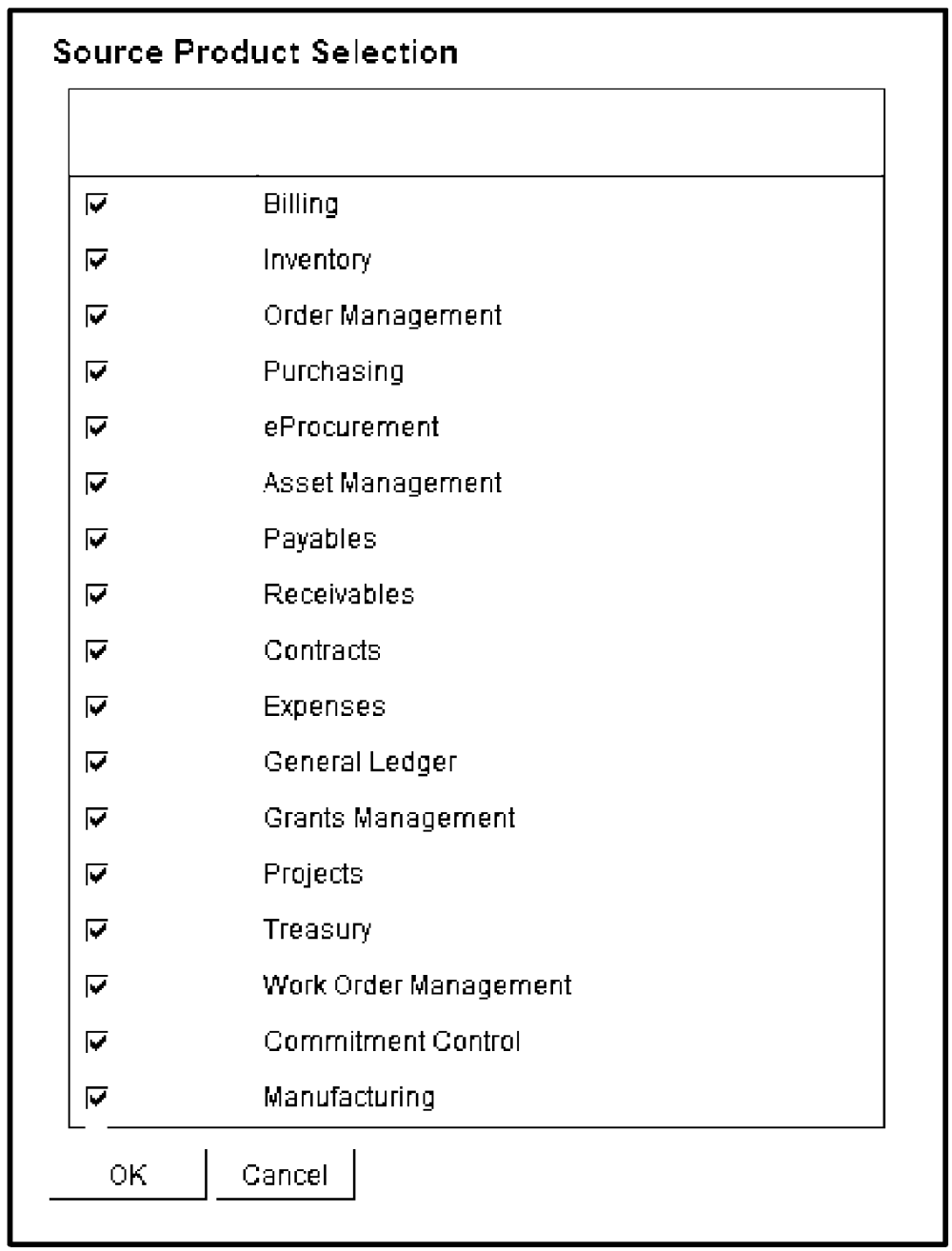

Referring to FIG. 2A, in act 203, computer 200 receives from administrator 210 their definition of a rule on one or more values that an accounting code may have. The rule is thereafter used by computer 200 to select information to be made available to a to-be-specified user (as shown in FIG. 2G) via a to-be-specified product (as shown in FIG. 2L). Specifically, in the screen shown in FIG. 2F, the administrator may set up rules on an accounting code that is enabled (e.g. in FIG. 2B). Note that the screen in FIG. 2F displays the name 221 of the accounting code (e.g. Department), followed by one or more rows of values for the accounting code. The administrator may add a row of values by clicking on the "add" button 225. Also, the administrator may change a value in a row and save the changes by clicking on the "save" button 226.

Each row in the screen of FIG. 2F identifies field criteria 222, which is selectable by the administrator to be (a) a range, (b) a value or (c) a tree node. Selection of range as field criteria 222 requires the administrator to specify two values in the row, namely a lower limit 223 and an upper limit 224. Selection of value as field criteria 222 requires a single value to be specified in the row. Selection of a tree node as field criteria 222 requires the administrator to specify a name of a tree, and a name of a node in the tree. The administrator may indicate a partial value in any row with a wildcard, such as the percentage sign "%" (e.g., 200%=all departments starting with 200). In some embodiments, a blank space in the input from a human is treated as a wildcard, and in such embodiments no "%" sign is required.

In the screen of FIG. 2F, a blank value for a parameter (such as an accounting code) is an implicit default value which indicates that the parameter will be matched to a blank value when security is checked. Specifically, a secured parameter that has a blank value when security is checked (in response to a user's input to access a screen of a secured product) is treated by computer 200 as an implicit "grant" of access to all values of the parameter. For this reason, administrators are not allowed by some embodiments of computer 200 to save a rule definition if the administrator has not defined any values for the accounting code for which the rule is being created. The just-described embodiments enable an administrator to use a value 291 of "blank" by default, as illustrated in FIG. 2O.

In addition to the rule definition tab 227 illustrated in FIG. 2F, this screen in graphical user interface (GUI) of computer 200 also has a users tab 228 as illustrated in FIG. 2G. In the screen of FIG. 2G, computer 200 receives from the administrator, identification 229 of a user on whom the rule is to be applied. The screen of FIG. 2G in some embodiments also allows administrators to create new associations between a rule, a user and a product, i.e. new assignments of rules to users (of a given product). The same function is supported, for assigning rules to users identified by Roles and Permission Lists (for a given product). Computer 200 also receives, via a hyperlink 230, selection of a product in which the parameter-security rule is to be applied, from among multiple software products for which parameter-security has been enabled (as per FIG. 2C). Specifically, on clicking on the hyperlink, the screen shown in FIG. 2H is displayed, and the administrator may select one or more products, e.g. the Payables product. The administrator may click "OK" in the screen of FIG. 2H to return to the screen of FIG. 2G, followed by clicking the save button.

In response to the administrator clicking the save button, computer 200 stores in memory, an association between the user identification 229, the identity of accounting product Payables selected in FIG. 2H, and the rule that was specified in FIG. 2F. The association may be stored e.g. in a row of a table 232 as illustrated in FIG. 2I. The row may be initially stored in volatile memory followed by writing to disk, e.g. in a relational database 1110. Note that acts 203 and 204 may be repeatedly performed by computer 200, to receive identifications of additional rules and their associations to users and products, and to store the additional associations in memory. In the example shown in FIG. 2I, there are only two rows at this stage (shown with solid lines) with the first row 235 being for the first rule AP_DEPT (defined in the screen of FIG. 2F), and the second row 236 being for second rule AP_ENTRY (defined in the screen of FIG. 2G).

Specifically, in an example of an accounts payable (AP) clerk, execution of these two rules (FIG. 2I) by computer 200 permits the user to access financial information via the Payables product for only accounts whose values are specified in the rules defined by table 240. Note that at this stage, with just these two rules (FIG. 2I) the user is allowed by computer 200 to access no other information, in any other product in the Peoplesoft product line. To enable the user to order supplies, an additional rule is created and associated with the user for use in the eProcurement product, as illustrated in FIGS. 2J-2L and discussed next.

In FIG. 2J, the administrator creates a new rule that is to be identified by the word "EMPACCT" as its name 241, in the rule definition tab as described above in reference to FIG. 2F. Note that FIG. 2J illustrates two rows of values. In a first row 233, the administrator defines a range by typing the number "630000" as a lower value 245, and typing the number "631000" as the higher value 246 of a range of user-accessible values for parameter 243, named "Account." In a second row 234, the administrator additionally types the number 634000 (e.g. on a keyboard) as an individual value 242 for the same parameter 243. In the just described example, the values 630000-631000 and 634000 are together identified as values defined by the rule "EMPACCT" for the parameter "ACCOUNT." Hence, when performing act 203, the just-described rule is stored in a table 240 in computer memory 1106 (FIG. 2I). Tables 240 and 232 are used in combination by the programmed computer to enable user VP4 to access information associated with accounts 630000-631000 and 634000 in product eProcurement, as illustrated by row 237 in FIG. 2I and discussed below.

Note that the administrator may look up a value by clicking on the symbol (e.g. of a magnifying lens) next to a field that requires a value. A lookup screen of the type illustrated in FIG. 2K is displayed by computer 200 when the symbol is clicked. Note that here as well, after definition of the values, the administrator clicks on the users tab (FIG. 2J) to identify the user VP4 and the product eProcurement to which the new rule is to be applied. Note that in addition to the EMPACCT rule, another rule REQ1 is also defined by the administrator, which identifies the AP clerk's department, and this rule is also associated with user VP4 for use in the eProcurement product. The table 232 in FIG. 2I is updated when the administrator clicks the save button in the screen of FIG. 2J to include rows 237 and 238.

At this stage, user VP4 may provide input to access the eProcurement product (e.g. by clicking on the mouse). In response, the computer 200 uses the user's identity VP4 and the identity of the product eProcurement to look up a table (which is an updated version of table 232 in FIG. 2I with two additional rows 237 and 238 shown dotted), and retrieve the two new rules EMPACCT and REQ1. Computer 200 then applies rules EMPACCT and REQ1 to select information for display to user VP4. At this stage, the user VP4 may use the eProcurement product to order office supplies and computer supplies (which are in a range, e.g. 630000-631000 for the account number) as per the first row 233 in FIG. 2J and purchase postage (which has the value e.g. 634000 for the account number) as per the second row 234 in FIG. 2J.

Figure 2M:
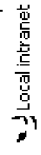

FIG. 2M illustrates as screen implemented in computer 200 to support assignment of rules to users. This screen (also called "page") is expressly designed to facilitate the assignment of multiple rules to one user. Via this screen, computer 200 provides a way for customers to perform on-going maintenance of rule assignments as changes occur in the organization, such as employee terminations, transfers, new hires, etc. Accordingly, an administrator may select a User ID to launch this screen, entering as an Effective Date any date in future when a rule is to be effective, select a security-enabled accounting code, select one or more rules, and select one or more products to which the rule(s) apply. The rule assignment by effective date gives the administrator a way to set up future-dated changes to rules to manage upcoming changes in the organization. The screen of FIG. 2M is used by an administrator to assign all rules for each accounting code to a user in the single screen.

Note that in several embodiments of computer 200, when a new effective date assignment is entered, the effective date only applies to the rules selected. Each time a new effective date record is created for a user, by default computer 200 copies all existing rule assignments to the new effective-date. In order to drop a rule assignment for a new effective-date record, the administrator must delete or remove it in this screen (FIG. 2M). The screen in FIG. 2M contains a checkbox labeled "Super User" which can be used by the administrator to identify the user as one who is to have access to all values of the secured accounting codes. The "Super User" checkbox minimizes the administrator's work in setting up users in an organization who are to have access to all values of accounting codes, such as executive officers, auditors, accountants, etc. When this checkbox is enabled, no rules have to be selected by the administrator.

Instead of clicking on a hyperlink to select products wherein a rule is to be applied, the administrator may enable a checkbox labeled "All Products" to indicate to computer 200 that this rule is to be applied to all products. If this checkbox is disabled, the administrator can select specific products by clicking the "Select Products" hyperlink column.

For a given rule, when a new group of values must be assigned, the administrator may click on the Add icon (+). In some embodiments of computer 200, any changes to rules do not take effect until the administrator clicks on the "Build" button 240 (FIG. 2M). In response to such clicking, the computer 200 builds the new configuration into tables of values of accounting codes, for future use in response to user input to access the selected product(s). Note that in some embodiments, all values in the security table (such as SEC_DEPT_USER illustrated in FIG. 2O) are re-built (e.g. on the next run of the batch job) in response to the clicking, i.e. all existing values are deleted and the new values are inserted.

Figure 2N:
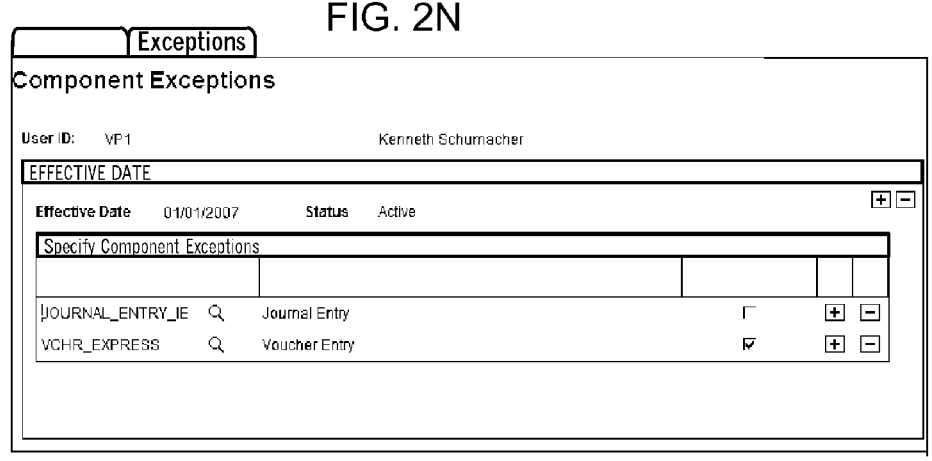

FIG. 2N illustrates an exception screen implemented by a computer 200 of some embodiments. For each rule that is assigned to a user, role or permission list, and to a product, the administrator may identify in the exception screen one or more components of the product as exceptions to the rule. When that user is operating a component identified as an exception for that user, computer 200 ignores all rules and all values of accounting codes can be accessed (and viewed) by the user. The exception screen of some embodiments includes, for each row (corresponding to a component), a checkbox to overwrite parameter-security for values displayed to the user in a prompt list. Specifically, in a prompt list, computer 200 displays a list of values that the user can select as a new or changed value to the entry. Hence, this feature of computer 200 overrides security for the list of values that the user can select. If the checkbox is enabled, then computer 200 enables the user to select any value from the list. If the option is not checked then the user can only select secured values from the list as identified by application of rules that are associated with that user's identifier.

Some embodiments of computer 200 enable an administrator to specify the actions to be performed by computer 200 in case of a conflict (called "partial access") between multiple rules that govern a user's access to information in a given product. Such a conflict may arise when: (a) in a given row, the user is (i) authorized to view information in the row identified by application of one rule and (ii) not authorized to view additional information in the same row that is identified by application of another rule; alternatively (b) in a transaction containing multiple rows of accounting codes such as in the component Journal Entry, some rows contain authorized values of accounting codes and some rows do not.

Computer 200 of certain embodiment enables the administrator to configure its operation on encountering partial access, via an option 215 that is illustrated in the screen of FIG. 2B. Specifically, a value that is set for option 215 causes computer 200 to display or not display information to a user based on whether all rules for that user are satisfied or only one rule is satisfied for that user. The administrator may choose option 215 to have one of the following values: Deny Access (do not allow user to access any information unless all rules are satisfied), Grant Access (allow user to access the information if at least one of the rules is satisfied), and Default to Higher Level (use as the value for this option, a corresponding value for this same option in another screen of the accounting software). Note that in some embodiments, partial access option 215 only applies to components that record (i.e. write) financial transactions and this option 215 is not supported in components that respond to inquiries by only displaying financial information (i.e. only read). In certain embodiments, default behavior for inquiry components in all products of the accounting software is to deny access.

In many embodiments of computer 200, each component initially (at start up) defines (as illustrated in FIG. 2R) a set of edit tables ("edit table set") that are to be used, for each field in which a list of values is to be displayed. From among the edit table set (as just described), an appropriate prompt edit table is automatically selected at run time (as illustrated in FIG. 2S), for each field of a component's screen, based on security options set by the administrator. Specifically, as illustrated in FIG. 2R, four columns 261-264 define in each row a prompt edit table for a parameter that may be displayed on a screen of computer 200 as follows: column 261 entitled "Edit Table" contains the normal edit table when chartfield security is not enabled, column 262 entitled "User ID Security View" contains the edit tables to be used when chartfield security is enabled based on the identity of a user, column 263 entitled "Role Security View" contains edit tables to be used when chartfield security is enabled based on the role of the user, and column 264 entitled "Permission List Security View" contains edit tables to be used when chartfield security is enabled for certain users identified on a permission list.

At run time, when a user attempts to open a screen of a component ("current component") computer 200 first retrieves the current component's attributes such as the product to which the component belongs ("source product") and the edit table set (FIG. 2R), the prompt edit tables for parameters in the screen to be opened, the security options such as whether or not parameter security is active, the type of security (e.g. permission list, user id or role), and exceptions. Based on these options, for each parameter to be displayed by the current component, computer 200 dynamically assigns a secured or unsecured prompt edit table, from the set illustrated in FIG. 2R to a derived edit field used by the current component to display the component's screen. Specifically, if parameter security is not enabled or if the component is identified as an exception, then the non-secured edit table is automatically assigned by computer 200. If security is enabled and there are no exceptions, then the secured edit table is automatically assigned by computer 200. Columns 271-274 of edit tables that are assigned dynamically by computer 200 are illustrated in FIG. 2S. Accordingly, depending on the security options, computer 200 returns an unsecured prompt table or a secured prompt edit table from among the tables shown in FIG. 2S.

Figure 3A:
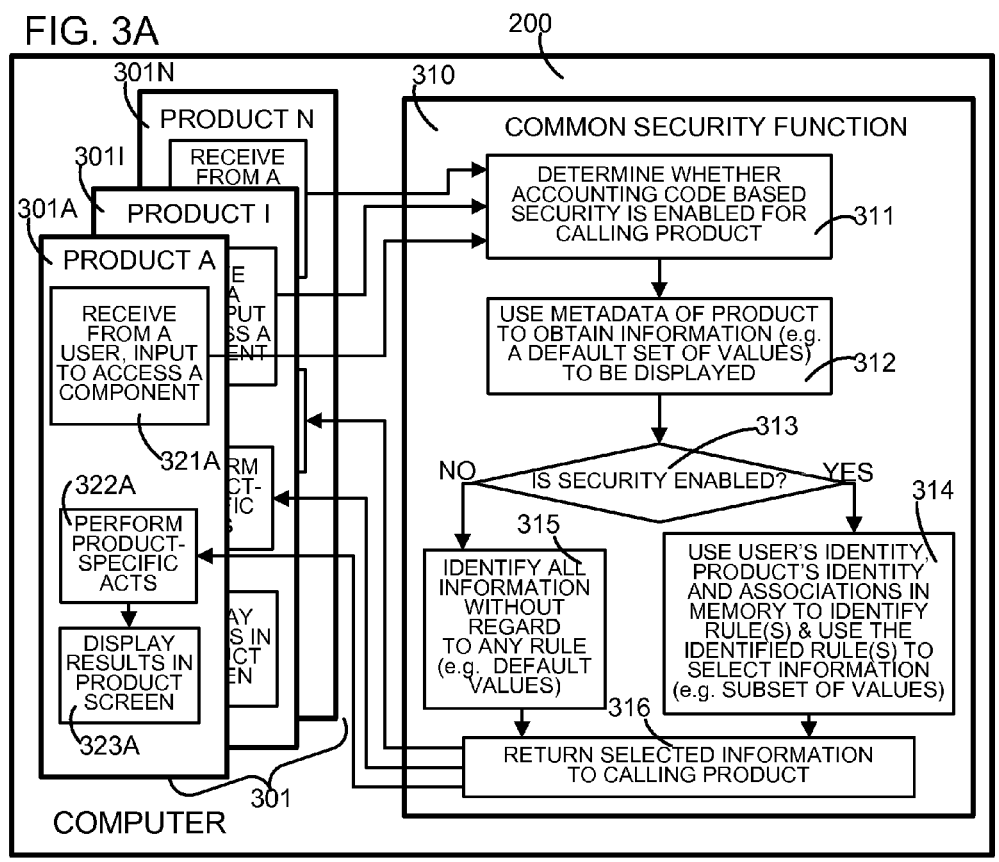
FIG. 3A illustrates, in a high-level flow chart, acts performed by the computer programmed in accordance with the invention to enable a user to access information which has been secured via rules that are specified by an administrator as illustrated in FIG. 2A.

FIG. 3A illustrates a method that is performed by computer 200 in some embodiments of the invention during normal operation by interacting with a user of accounting software. Specifically, each of several products 301A . . . 301I . . . 301N (wherein A≤I≤N, with N being the number of products in the product line 301), on receipt of user input to access a component therein, computer 200 invokes a function 310 to check whether the user is permitted to access information that is being requested. For example, in FIG. 3A, product A performs act 321A to transfer control to act 311 in a function 310.

Function 310 is called, in some embodiments discussed below, by more than one product among products 301A . . . 301I . . . 301N in a product line 301 of software being executed by computer 200. The calling of (i.e. invocation of) a common security function by multiple products in a product line eliminates the need for each product to individually implement its own security function internally, which also simplifies maintenance of the security function, across the multiple products. Note, however, that alternative embodiments implement function 310 or an equivalent thereof independently within each of products 301 A . . . 301I . . . 301N, as will be apparent to the skilled artisan in view of the following description.

In some embodiments of function 310, computer 200 performs act 311, to determine whether parameter-security is enabled for the user in a calling product (which in this example is product A). Parameter-security may be disabled, for example, for a super user via a checkbox shown in FIG. 2M. Also, security may be disabled for a product, e.g. via a checkbox shown in FIG. 2D. Next, in act 312, computer 200 uses metadata of the calling product to obtain information that is to be displayed (e.g. a default set of values). Next, in act 313, computer 200 checks whether or not security is enabled (as determined in act 311).

If security is not enabled, computer 200 goes to act 315 and identifies all of the information obtained in act 312 for use in act 316, i.e. without regard to any parameter security rule. If security is enabled, computer 200 goes to act 314 and selects a portion of the information obtained in act 312 for use in act 316, i.e. by applying parameter security rules. The rules that are applied in act 314 use the user's identity and the product's identity to identify user-accessible values of a parameter. In some embodiments of act 314, computer 200 checks access, i.e. checks whether the user is allowed to access all data that is responsive to the user's input data for a query as discussed below in reference to FIG. 4A. In certain alternative embodiments, computer 200 identifies all information that is responsive to the query regardless of any parameter security rule, e.g. as per act 315. However, a few embodiments perform another act (not shown in FIG. 3A), wherein computer 200 restricts access to only that data to which this user has access.

As noted above, in some embodiments rules defined in tables 232 and 240 illustrated in FIG. 2I are flattened by a batch job into the SEC_ACCT_USER table 257 illustrated in FIG. 2O, e.g. one row is created for each unique pair of parameter name and value combination identified by parsing a rule in table 240 that uses multiple values, such as a range, a wildcard or a tree. Hence, during normal operation of computer 200 of some embodiments, the SEC_ACCT_USER table 257 is automatically used with the user's identity and the product's identity, to retrieve user-accessible values which are then used to retrieve information from database 1110. Next in act 316, the computer returns to the calling product, the information either identified in act 315 or retrieved from database 1110 in act 314. Hence, at this stage, control transfers back to whichever one of products 301A . . . 301I . . . 301N invoked function 310.

Specifically, in the example, after act 316, computer 200 performs act 322A in product 301A. In act 322A, computer 200 performs any product specific acts, e.g. sorting and/or summarizing the information received from act 316. Next, in act 323A, computer 200 displays the results on a product-specific screen. Note that act 322A is optional, e.g. in some products, there may be no product-specific acts, i.e. the information received from act 316 is simply displayed in act 323A.

Note that information on whether or not parameter security is enabled for a product and/or for a user, as well as parameter security rules, and the associations are all stored in a database 1110 in some embodiments as illustrated in FIG. 5B. Also, in some embodiments, common security function 310 appends one or more additional criteria, based on parameter security rules applicable to the current user and for the current product, to queries that are normally issued to database 1110, by components of a current product to obtain information ("first information") to be processed within one of products 301A-301N.

In some embodiments, computer 200 performs two types of operations to apply parameter security rules as follows: (a) limit the values displayed in a list of values for a parameter when security is enabled and (b) prevent the user from directly entering an unauthorized value for a parameter (i.e. by not using a list of values). In some components of a product that support transaction entry by a user, computer 200 presents a search view as an initial screen of the component. The search view includes a list of transactions or rows from which the user may select one row for modification. In such screens, computer 200 is programmed to apply parameter security rules when the user selects a transaction or row from the list of transactions or rows.

FIG. 3B illustrates a transaction entry screen that opens with a search view of previously-entered transactions in a Journal Entry component of an accounting software product (e.g. the product General Ledger in the product line PeopleSoft Financial). In the screen of FIG. 3B, a bottom portion 341 displays in one row per transaction, all transactions that meet the user's input data (i.e. field criteria). In several embodiments of the invention, all results responsive to the user's field criteria are displayed in bottom portion 341, independent of any parameter security rules at this stage. However, if in this screen portion 341, the user selects a transaction by double clicking on a row 342 in FIG. 3B, then the just-described embodiments apply parameter security rules in formulating a query to database 1110. If the transaction selected by the user contains one or more lines of information based on parameter values that user is not authorized to view (i.e. not accessible to the user), and if the partial access option is set to "Deny Access", computer 200 does not allow the user to access the transaction's details, by displaying an error message 343 to the user as shown in FIG. 3C.

If the partial access option is set to "Grant Access" then the user is allowed to view a selected transaction's details in another screen, i.e. computer 200 does not display the error message 343. Note that parameter security rules are not applied by computer 200 of certain embodiments to each transaction when constructing search criteria for transactions shown in bottom portion 341 of FIG. 3B. Instead, parameter-security is only enforced in the certain embodiments for a single one of (or a small number of) the transaction(s) selected by the user (as per FIG. 3C) from among the displayed transactions in bottom portion 341. As parameter security is checked on only user-selected transaction(s), the performance impact of applying parameter security is minimized, in the just-described certain embodiments.

In some components of a product that support an inquiry by a user, computer 200 displays a screen showing all rows that are returned in response to a corresponding query by a component to database 1110 in the absence of any parameter security. For example, see rows 344 in FIG. 3D that are all the rows returned by database 1110 for a Review Journal Status component in FIG. 3D, although blanks 345 are displayed in place of values that are secured by parameter security rule(s). Note that the component Journal Status belongs to the product General Ledger in the product line PeopleSoft Financial. In this example, when the user selects any one row from among the displayed rows that contains parameter values the user is not authorized to view, access is denied by computer 200 displaying an error message 346, unless values to be displayed are blank because in this example blank values are authorized to be accessed by all users (as a default).

Note that in some components, computer 200 allows the user to directly enter a parameter's value into a field (e.g. by typing the value on a keyboard), as an alternative to using a mouse to select a value in a prompt list (of user-accessible values). In one such screen (not shown) the user may directly enter a value into the "Account" field or the "Dept" field both of which are configured as parameters (called "accounting codes") on which parameter security rules are defined (in the screen illustrated in FIG. 2C). Hence, the user's direct entry into either of these two fields is automatically checked by computer 200 against values specified in parameter security rules. If computer 200 finds that the user does not have access to the parameter's value entered by the user, computer 200 highlights the user-entered value of the accounting code (e.g. by changing the color of the field to red), and displays an error message 348 (FIG. 3E). In some embodiments, such checking of directly-entered values is performed by computer 200 only in those components that support entry of transactions by the user. In the just-described embodiments, in components that support inquiry by a user, the prompt list is not secured and instead security is enforced on the results returned from database 1110 in response to the inquiry (e.g. based on parameter values specified as being accessible to the user).

Accordingly, in certain alternative embodiments, search results returned by database 1110 are automatically filtered by computer 200 applying parameter security rules, prior to display of the results to the user. For example, previously-entered transactions shown by a Journal Entry component as illustrated at the bottom portion 341 of FIG. 3B are filtered using the user's field criteria, and these results are further filtered by criteria for parameter security. Specifically computer 200 executes a security function (common to all components of a product line) to check if the unfiltered results include values of a parameter that have been secured for the current user in the Journal Entry component, along with data that has been previously identified as being sensitive (e.g. transaction amounts). Accordingly, in the alternative embodiments, no error message is displayed when the user clicks on a row in the displayed results, because all rows displayed therein have already been checked against parameter security rules specified for the user.

FIG. 3F illustrates an inquiry screen for the General Ledger product of the accounting software wherein the user may enter values for several search criteria, which may include one or more accounting codes, such as "Account" and "Department." Computer 200 is programmed to apply parameter security rules to filter a result set that contains transactions to be displayed to the user in response to execution of a query to a database 1110 based on the user-entered field criteria. In FIG. 3F, the user can select one or more accounting codes to sum by, in the information to be displayed. Computer 200 only filters the result set if the selected accounting code is secured, i.e. on which parameter security rules have been defined (in the screen illustrated in FIG. 2C). The filtered result set is then displayed, as illustrated in FIG. 3G. In FIG. 3H, the result set is filtered only if "Account" is a secured accounting code, since "Account" is the only accounting code used to identify the information being displayed.

Figure 3I:
Figure 3K:

FIG. 3I illustrates, at the bottom of the screen, a hyperlink to allow a user to request display of details on a transaction in a component, in this example for the Ledger product. Computer 200 applies parameter security rules to check if the user can be allowed to view the details of the transaction and if not then an error message is displayed. FIG. 3J illustrates a screen that is displayed when the user's clicking on a hyperlink opens a new window. Parameter security rules are applied in this screen (FIG. 3J) in some embodiments of computer 200. In another example, the user drills down (by clicking on a hyperlink) to Journal Entry (FIG. 3K) from a Journal Suspense correction screen (FIG. 3J). On doing so, parameter security rules are applied in the Journal Entry screen (FIG. 3K) which displays an error message.

Note that FIG. 3H illustrates a screen for the Accounting Summary component of the accounting software. This screen provides a number of hyperlinks (in the second column and in the last column shown in the bottom half of the screen) that allow a user to drill to a component or screen which replaces the existing screen. In this situation, parameter security rules are applied before transferring control back to the component or screen, and an error message of the type shown in FIG. 3E is displayed if the user does not have permission to access the detailed data. Note that the component Accounting Summary belongs to the product General Ledger in the product line PeopleSoft Financial.

In the example illustrated in FIG. 3L, a user is denied access in response to the user clicking on "GL Journal", i.e. even before entering into the Journal product. In some embodiments, computer 200 also limits the values included in a prompt list that is displayed to a user for making a selection. For example, in FIG. 3D, in response to the user clicking on a magnifying lens icon 347, computer 200 displays only the identifiers of those business units to which the user has access, as determined by application of parameter security rules. Specifically, computer 200 displays only a subset of values that are obtained by application of the parameter security rules, rather than the entire set of values available to computer 200. FIG. 3M illustrates a screen that displays only a subset of values, with parameter security rules active in an illustrative embodiment of the invention.

FIG. 3N illustrates the complete set of values shown in a prior art version of the screen of the invention's embodiment illustrated in FIG. 3M, when parameter security rules are not applied.

In an example illustrated in FIG. 3O, a user indicates to computer 200 to look up values of a parameter, namely "DEPT" in field 350, by clicking on the magnifying lens icon adjacent thereto. In response several embodiments of computer 200 respond by displaying the screen illustrated in FIG. 3P, which is populated with values 350 for the DEPT parameter that are accessible to the current user in the current product. Specifically, computer 200 generates the list of values 350 using the SQL query shown in FIG. 3Q that uses a view PS_SEC_DEPT_NB_UVW. Also as shown in FIG. 3Q, view PS_SEC_DEPT_NB_UVW is predefined in a memory of computer 200 to check if the values of DEPTID to be displayed to the user are user accessible as per SEC_DEPT_USER table 257. Specifically, as noted above, SEC_DEPT_USER table 257 identifies values of DEPTID that are accessible to the user in the current product.

FIG. 3R illustrates a prior art version of the screen illustrated in FIG. 3P, when parameter security rules are not applied. The screen in FIG. 3R is generated by executing the SQL query illustrated in FIG. 3S, wherein PS_DEPTID_NB_VW is a regular database view which does not have any security applied thereto.

Whether a security view PS_SEC_DEPT_NB_UVW is used or instead unsecured view PS_DEPTID_NB_VW is used depends on which of these two views is identified in a table (FIG. 3T) for each field of a screen. As shown in a detail record structure (implemented as a database table) illustrated in FIG. 3T, each row identifies for each field, what is its type, whether or not input is required from the user, whether the value can be entered by the user or if a list of values is to be displayed, and an identifier of the prompt edit table. For example, the screen illustrated in FIG. 3O has a field "*UNIT" which has a field name "BUSINESS_UNIT" in FIG. 3T, and the value in this field is of type "Char" (i.e. a string of characters), and this value is required for a proper query, and this value is to be selected by the user (i.e. prompted), and the values to be displayed are defined by the view SP_BU_GL_NONVW.

Note that the metadata of a detail record structure illustrated in FIG. 3T is created at run-time, by computer 200 assigning a secured view or a non-secured view depending on security options set by the administrator. Specifically, at run-time, computer 200 dynamically assigns whichever view is appropriate, based on an edit table set of the type discussed above in reference to FIG. 2S. For certain fields, such as ACCOUNT and DEPTID, computer 200 uses field names (called "derived edit fields") that are placeholders (e.g. %EDIT_ACCOUNT, %EDIT_DEPT) in order to dynamically assign prompt edit tables at run time, as described below in reference to act 433.

Note that the security view PS_SEC_DEPT_NB_UVW shown in FIG. 3Q also uses SETID, which is not a critical aspect of some embodiments of the invention. Specifically, in some embodiments, the parameter SETID is used by multiple businesses within an organization to share the same account (instead of replicating the account in each business).

Note that in some embodiments, another parameter called "distribution code" is used to secure a prompt list displayed by a component, although the distribution code is not itself used to secure a user's access to the component's screens. This is because in these embodiments, the distribution code is not set up by an administrator as a chartfield itself, and instead the distribution code is used by computer 200 to derive values of one or more chartfields that are themselves secured by the administrator. As noted above, one or more chartfields are parameters that are secured in several embodiments (e.g. as illustrated in FIG. 2D), although as just noted an administrator may enable computer 200 of some embodiments to secure values of a non-chartfield parameter, such as a distribution code (e.g. for values in a prompt list) in a component registry screen.

Computer 200 of some embodiments is programmed to execute instructions to perform methods of the type illustrated in FIGS. 4A-4G. Specifically, each of products 301A . . . 301I . . . 301N in an accounting software are programmed to invoke a method 400 described below ("CheckAccess") and illustrated in FIG. 4A, to check for security in access to information of a financial transaction in computer 200. In the illustrated embodiments, the method CheckAccess (FIG. 4A) is called by a component (with the component's name as a parameter) whenever a user tries to open a screen of the component.

The method CheckAccess (FIG. 4A) is used in some embodiments, to determine if any data to be displayed in the current screen is not accessible to the current user. If method CheckAccess (FIG. 4A) determines that any data is not accessible to this user, then error message 343 is displayed, if partial access option has been set by the administrator to "Deny Access" as described above in reference to FIG. 3C. If method CheckAccess (FIG. 4A) finds that all data is accessible to the current user, then the data is provided to the component which invoked this method, e.g. as per act 316 in FIG. 3A.

Note that in several embodiments, method CheckAccess (FIG. 4A) is designed such that the only change to a component of the prior art to implement parameter-security is to simply call the method CheckAccess. So, there are no additional changes anywhere within a prior art component.

Figure 4A:
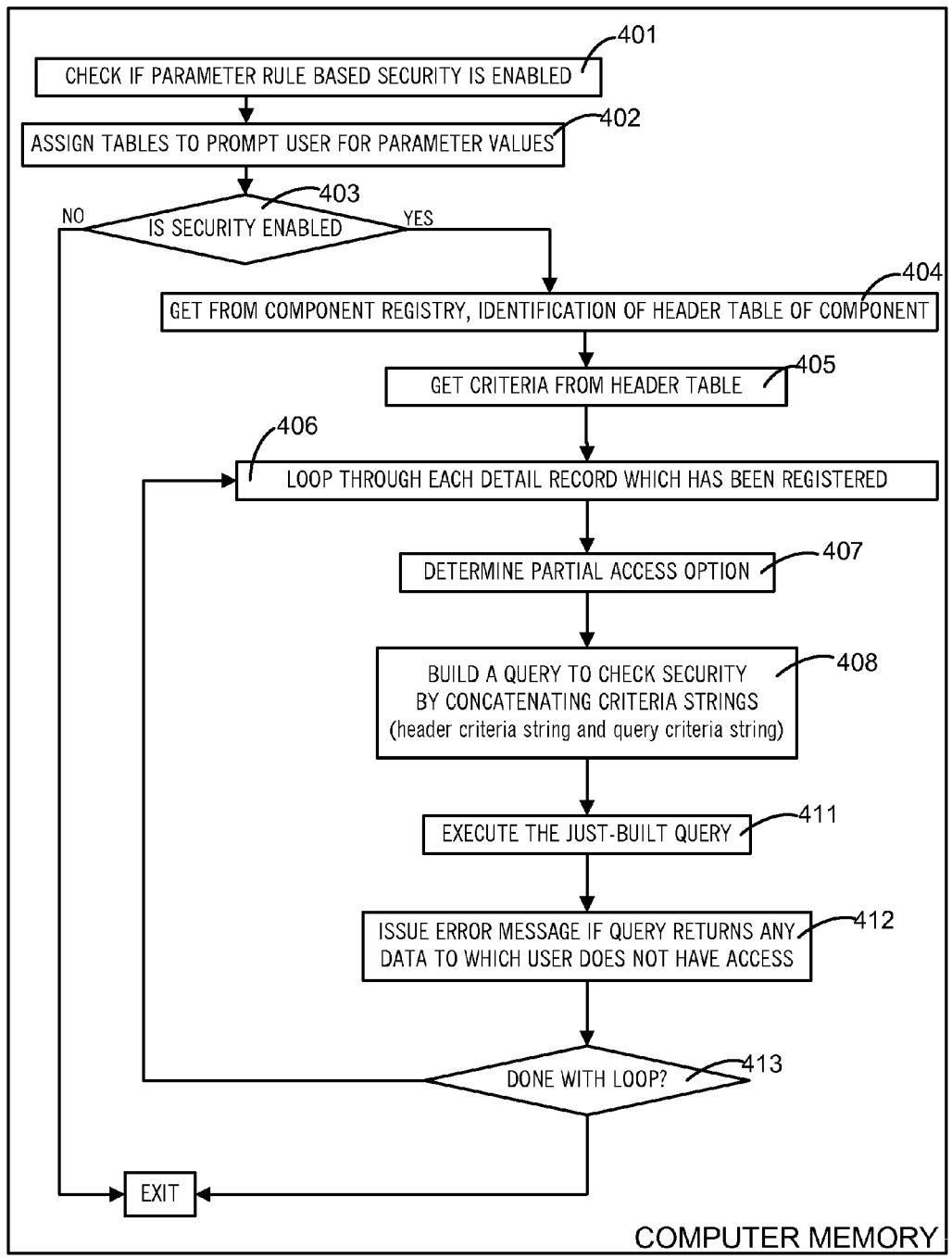
Figure 4B:
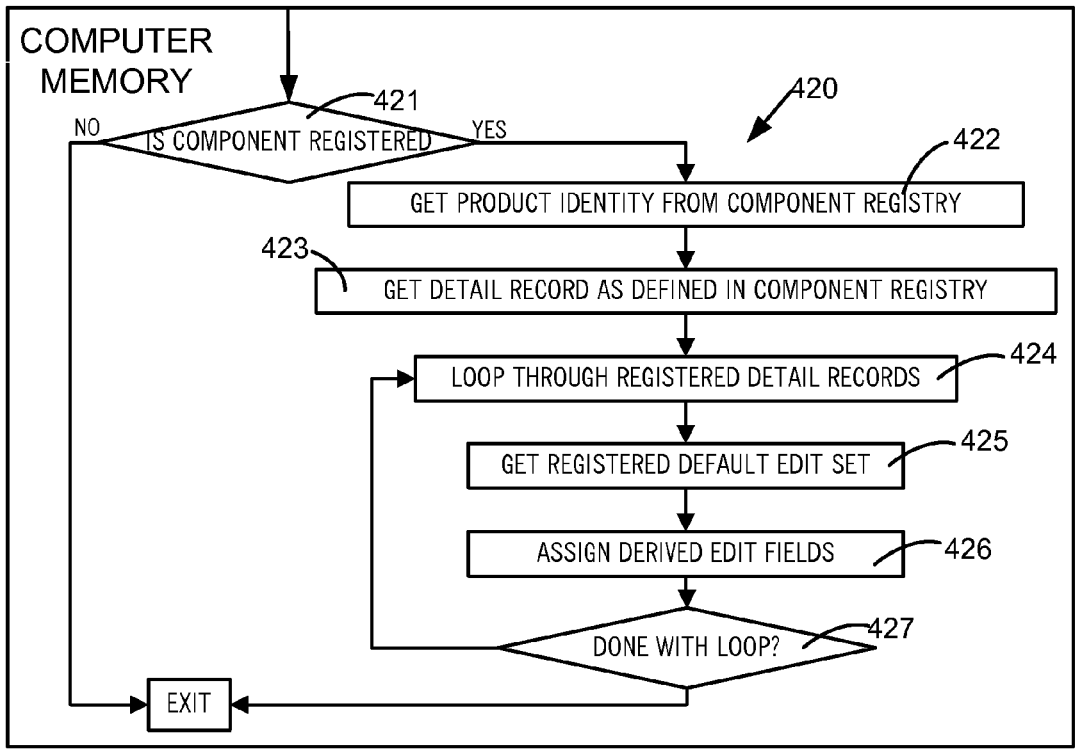

Referring to FIG. 4A, in an act 401, computer 200 initially executes a method 460 (see method SecurityEnabled in FIG. 4F) to check if parameter security (also called "chartfield security") is active for the current component, and even if enabled whether there is an exception for the current user (e.g. if the user is identified as a super user). If the user does not trigger and exception and if parameter security is active for the current component, then in act 402, computer 200 calls another method (see method AssignEditTbls in the flow chart in FIGS. 4B and 4C) to assign prompt edit tables (previously defined, and stored in memory) to be used in creating a screen for the current component. As noted above, prompt edit tables contain a list of values accessible to the user that are displayed by computer 200 in a dropdown list box, in response to the user clicking on a magnifying lens icon as noted above.

Next, in act 403, computer 200 checks to see if parameter security (e.g. chartfield security) is active as determined by act 401, and if so performs the following acts. In act 404, computer 200 retrieves identification of the current component's header record, from a registry in computer memory 1106 (wherein all components of the product line are registered). As noted above the header record of a component holds information (e.g. keys) to be used to identify the data which the current component will display to the user, e.g. to identify a single voucher, a single purchase order or a single journal transaction. Such a registry may be implemented in computer 200 in the normal manner, and may be stored in database 1110. The specific manner in which the just-described component registry is implemented is not a critical aspect of certain embodiments.

Next, in act 405, computer 200 begins to automatically build criteria (see string 483 in FIG. 4H) for later use in an SQL statement to be issued to database 1110. Specifically, computer 200 invokes a method (see method BldHdrCriteria in FIG. 4G) to obtain key fields from the current component's header record (e.g. JOURNAL_ID, JOURNAL_DATE and BUSINESS_UNIT_IU in FIG. 4H), and stores them as a string 483 (also called "field criteria string") that has a predetermined name in the SQL statement, for example "sqlHdrCriteria". Note that at this stage the header record in computer 200 already contains the user's input data, e.g. the date "Feb. 1, 2000" in which the user is interested, and hence the user's input is included with corresponding keys in sqlHdrCriteria string 483.

Therefore, sqlHdrCriteria string 483 is automatically created by computer 200 in act 405, using key fields that a component normally uses to issue a query to database 1110 in the absence of parameter security rules. String 483 is normally used by the component in computer 200 to identify a single accounting transaction, such as a voucher or a purchase order or a journal entry. Field criteria string 483 is thereafter automatically modified by computer 200, by use of parameter security rules so that a user (as per their identity) is allowed access to only first information that is selected by the administrator as being accessible to this user, but not second information which is also present in database 1110 but determined by the administrator to be not accessible to this user. In summary, field criteria string 483 that is created in act 405 contains an SQL where clause, which is thereafter modified as discussed below to include one or more criteria that implement parameter security rules applicable to the current user and to the current product.

Figure 4C:
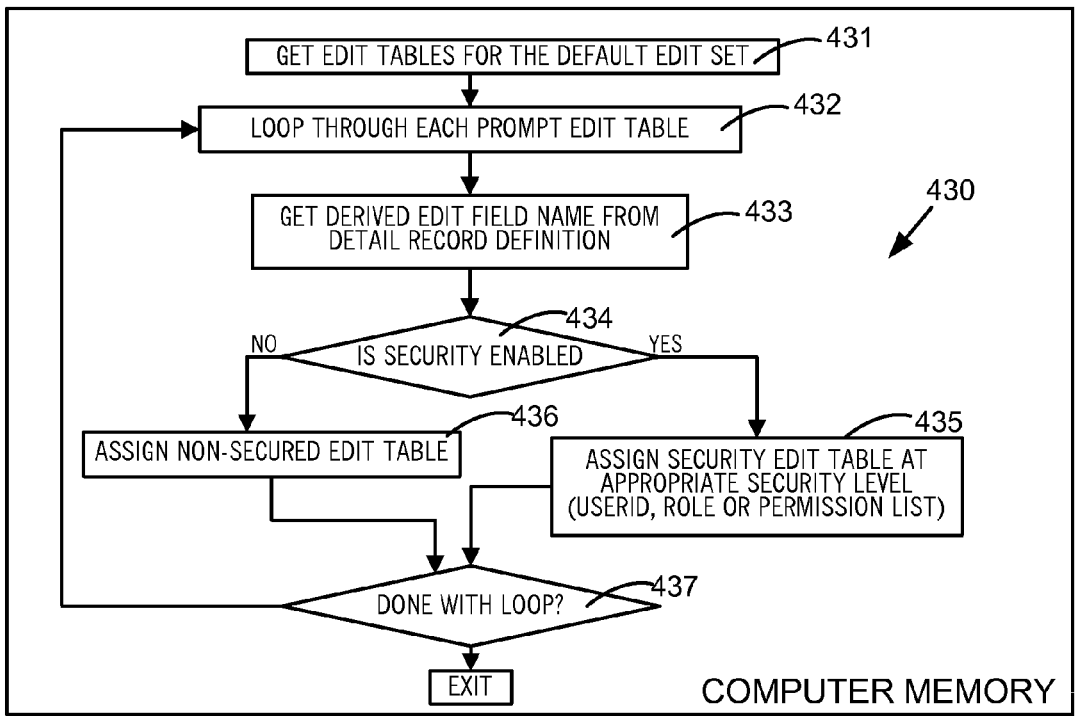
Figure 4E:
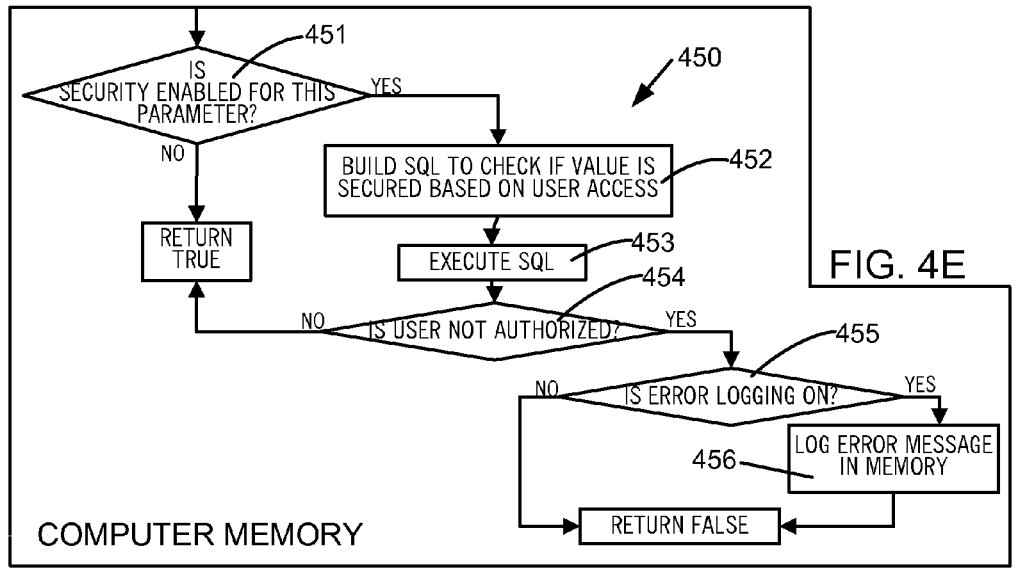
Figure 4D:
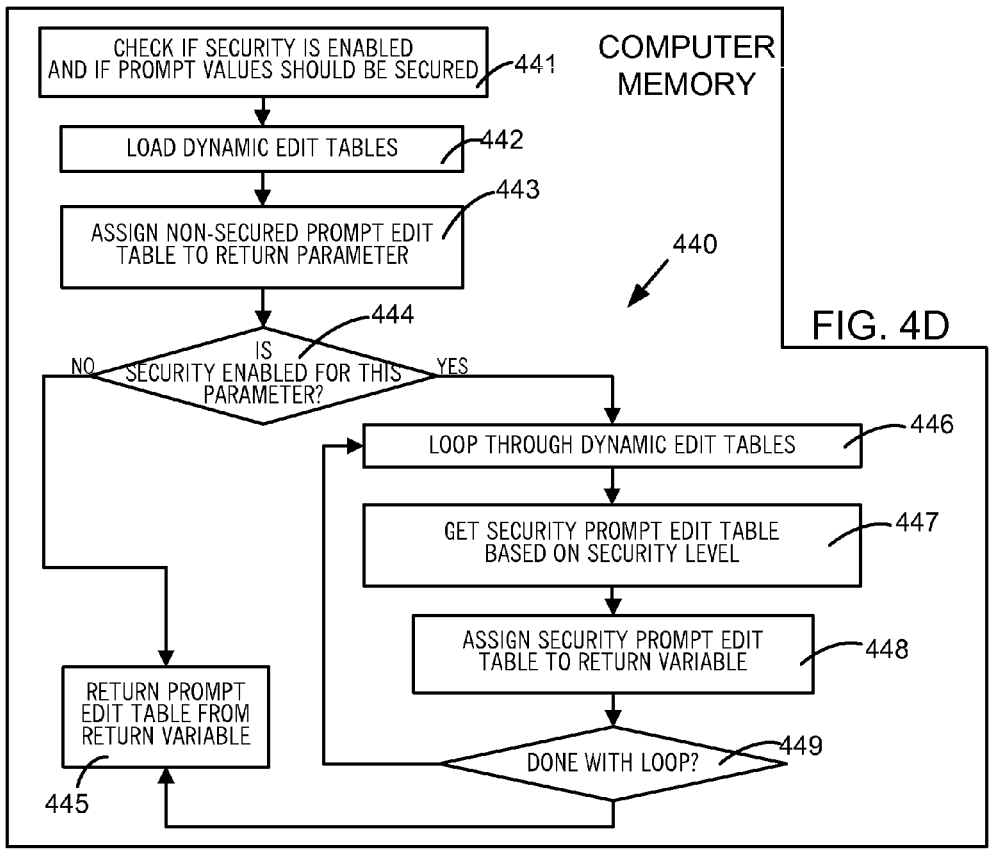
Figure 4H:
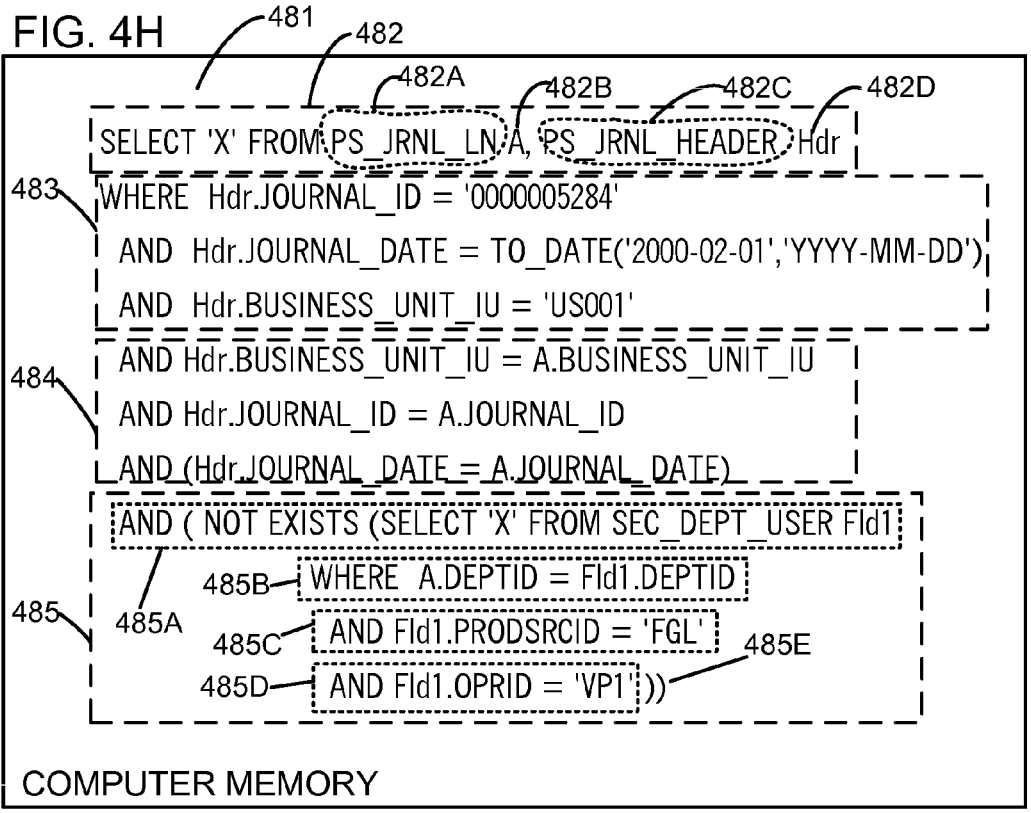
FIGS. 4H and 4I illustrate SQL statements in a computer memory that are automatically generated by a computer in accordance with the invention.

After act 405, computer 200 performs act 406 by entering a loop over a number of detail records that have been registered by the current component, in order to join them with the header record to automatically create an SQL query, e.g. as illustrated in FIG. 4H. As noted above, detail records store additional information to identify the data to be displayed in one of several portions of a screen of a component. Most components in a product line (such as Peoplesoft Financials) may register only one or two detail records, in addition to the header record. However, certain components may register more than two detail records, depending on the data to be displayed. As noted above, an administrator can predetermine (e.g. in the screen of FIG. 2Q) whether or not parameter security is active for each detail record of each individual component. Hence, within this loop (act 406 in FIG. 4A) computer 200 performs acts 407-412 described below, once for each detail record and depending on whether parameter security is active, as discussed next.

In act 407, computer 200 determines a value of the partial access option (as received in field 215 of FIG. 2B), followed by act 408. In act 408, computer 200 automatically builds the SQL query, using field criteria string 483 (specifically, in the where clause) and additional strings which are created based on information in the detail record, as well as by applying parameter security rules as described above. In act 408 if the partial access option (as determined in act 407) is "Deny Access" computer 200 loops through each secured field for the user, and uses the corresponding parameter security rule to build a string containing the SQL query to check if the transaction data contains any unauthorized values. Similarly, in act 408 if the partial access option (as determined in act 407) is "Grant Access" computer 200 loops through each secured field for the user, and uses the corresponding parameter security rule to build a string containing the SQL query illustrated in FIG. 4I. Moreover, note that although in some embodiments, in act 408 computer 200 concatenates strings, in other embodiments computer 200 uses a "printf" function. A detailed flow chart illustrating one specific implementation of act 408 is shown in FIG. 4J, and described below.

Figure 4I:
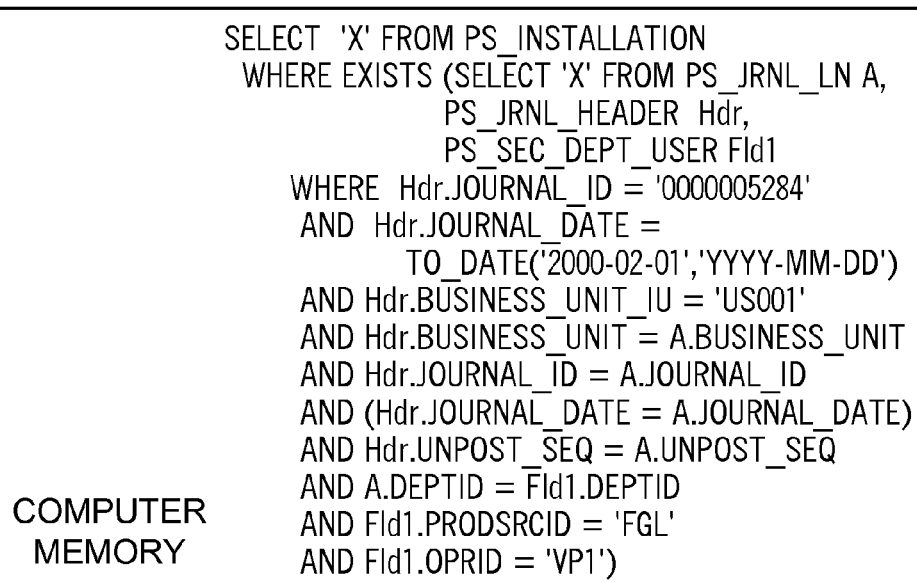
Figure 4J:
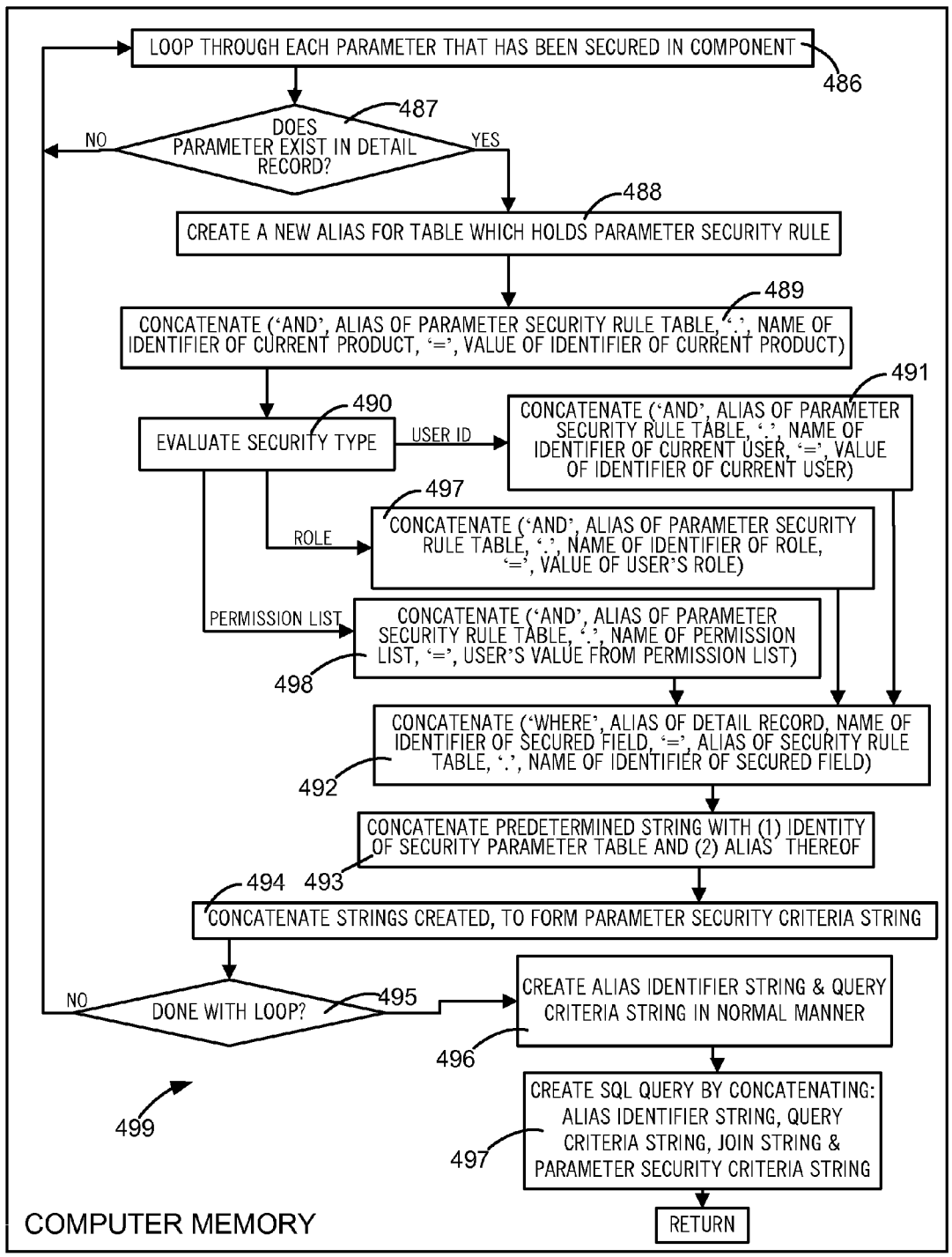

After an appropriate SQL query (e.g. as illustrated in FIG. 4H or FIG. 4I) is automatically built as described above in reference to act 408, thereafter in act 411, computer 200 executes the just-built SQL query. Subsequently, in act 412, computer 200 checks if execution of the SQL query has identified any value for the parameter to which the user does not have access. Specifically, act 412 checks if the SQL that is built in act 408 and executed in act 411 returns any values. If computer 200 finds that the user does not have access, then an error message is displayed (e.g. see message 343 in FIG. 3C; also see FIG. 3E), in order to prevent the user from accessing the component's screen.

Each product in a product line in computer 200 executes method 420 (see Assign EditTbls method in FIG. 4B) to assign one or more prompt edit table(s) as follows. Specifically, in act 421, computer 200 checks to see if the component is registered and if not, then computer 200 exits this method. If yes, then computer 200 proceeds to act 422 to retrieve an identity of the product to which the component belongs, from a component registry (implemented as an area of memory to hold information on each component in the product line). Next, in act 423, computer 200 retrieves one or more detail records for the component, also from the component registry.

Then in act 424, computer 200 enters a loop over all detail records (e.g. as illustrated in FIG. 2Q) that were retrieved, to perform acts 425 and 426 for each detail record as follows. In act 425, computer 200 retrieves the registered default edit set which defines the default edit tables. Next in act 426, computer 200 executes the method 430 (FIG. 4C) to assign the derived edit fields. After completion of method 430, computer 200 checks if all detail records have been processed and if so exits but if not returns to act 424.

In method 430, which is invoked from act 426, computer 200 performs act 431 to get the edit tables for a default edit set, e.g. by performing method 440 (FIG. 4D). Next, computer 200 enters a loop in act 432, over each prompt edit table, to perform acts 433-436, as follows. In act 433, computer 200 gets the name of a derived edit field from the detail record definition. As described above, derived edit fields are placeholders (e.g. %EDIT_ACCOUNT, %EDIT_DEPT) that identify the appropriate prompt edit fields. Next, in act 434, computer 200 checks if security is enabled for the current component, e.g. as illustrated by method 460 in FIG. 4F. If not enabled, then computer 200 goes to act 436 and assigns a non-secured edit table and goes to act 437. Non-secured edit tables are also assigned at this stage (1) if this user is a superuser or (2) if this user has been identified in an exception for this component (3) if the parameter is not secured, or (4) if security is disabled for the current component (even if security is enabled for the product that owns the current component).

Referring to FIG. 4C, if the answer is yes in act 434, then computer 200 goes to act 435 and assigns the security edit table, and then goes to act 437. In act 435, the security edit table is assigned at an appropriate security level such as UserID, Role and Permission List, thereby to implement the administrator's option to secure data at one of these levels. In act 437, computer 200 checks if there are any more prompt edit tables to be processed and if so returns to act 432.

Computer 200 executes a method 440 illustrated in FIG. 4D in order to apply parameter security rules to obtain a secured edit table to be displayed to a user in a prompt list of values, based on an unsecured edit table that is otherwise used (if security is not enabled). Hence, in some embodiments, before assigning an edit table to the parameter being secured (e.g. chartfield), a component executes method 440 to obtain the secured edit table based on applying the parameter security rules as follows. Specifically, in act 441, computer 200 checks if security is enabled, e.g. by performing method 460 in FIG. 4F and if so whether prompt values should be secured. The answer is stored in a temporary variable, and then computer 200 goes to act 442 to load the dynamic edit tables.

Referring to FIG. 4D, in act 443, computer 200 assigns the non-secured prompt table to a return parameter and goes to act 444. In act 444, computer 200 checks the temporary variable to see if security is enabled for this chartfield, and if no then goes to act 445 where computer 200 returns from the current method with the return parameter (which was set in act 443). If the answer in act 444 is yes, then computer 200 goes to act 446 and enters a loop to perform acts 447 and 448 for each dynamic edit table (loaded in act 442). Specifically, in act 447, computer 200 obtains the security prompt edit table as described above, based on the security level. Next, in act 448, computer 200 assigns the security prompt edit table to the return parameter, and goes to act 449. In act 449, computer 200 checks if there are any more dynamic edit tables to be processed and if so returns to act 446. If there are no more dynamic edit tables to process then computer 200 goes from act 449 to act 445 (described above).

Referring to FIG. 4E, a method 450 is typically invoked by a component in a product to check if a value that has been entered by a user is authorized. Typically, the method 450 receives a field name and a user-entered value. In performing method 450, computer 200 checks in act 451 whether parameter-based (e.g. chartfield based) security is enabled, e.g. whether a product to which the current component belongs has been enabled by the administrator, e.g. as per FIG. 2D. If the answer in act 451 is no, then computer 200 returns from this method with a return value set to true. If the answer in act 451 is yes, then computer 200 goes to act 452 to build an SQL query to check if the value received in invoking method 450 is secured, based on user access.

Referring to FIG. 4E, in act 453, computer 200 executes the SQL query built in act 452, and then goes to act 454 to check the result. In act 454, computer 200 checks if the user is not authorized to use the value. If the answer in act 454 is no, i.e. the user is authorized then again computer 200 returns from this method with a return value set to true. If in act 454, the answer is yes, then computer 200 goes to act 454 to do error processing. Specifically, in act 454, computer 200 checks if error logging is turned on and if so goes to act 456 and logs the error message in memory and then returns from this method with a return value set to false. Computer 200 also returns from this method with a return value set to false if the result in act 455 is no.

In some embodiments, method 440 (FIG. 4D) and method 450 (FIG. 4E) are invoked by individual components that are included in one or more products of a product line. Specifically, method 450 is invoked to check if an individual value is a secured value (by applying the parameter security rules). Method 440 is invoked to get the security prompt table for a specific prompt table (which contains the prompt list of values to be displayed to a user). For example, several products of one embodiment include software instructions to assign prompt edit tables based on specific logic.

Referring to FIG. 4F, in performing method 460, computer 200 checks in act 461 whether parameter (e.g. chartfield) security is enabled, e.g. whether a product to which the current component belongs has been enabled by the administrator, e.g. as per FIG. 2D. If the answer in act 461 is no, then computer 200 returns from this method with a return value set to false. If the answer in act 461 is yes, then computer 200 goes to act 462 to check if at least one parameter (e.g. chartfield) has been selected to be secured. If the answer in act 462 is no, then computer 200 again returns from this method with a return value set to false. If the answer in act 462 is yes, then computer 200 goes to act 463 and checks if the component is registered in the component registry and has been activated.

Referring to FIG. 4F, if the answer in act 463 is no, then computer 200 again returns from this method with a return value set to false. If the answer in act 463 is yes, then computer 200 goes to act 464 and checks if the super user option is enabled for the current user. If the answer in act 464 is yes, then computer 200 again returns from this method with a return value set to false. If the answer in act 465 is no, then computer 200 goes to act 465 and checks if the component is listed as an exception to enforcement of security (e.g. configured by the administrator). If the answer in act 465 is yes, then computer 200 returns from this method with a return value set to false and otherwise with a return value set to true.

Referring to FIG. 4G, in method 470 computer 200 enters a loop in act 471 to perform acts 472 and 474 for each header record field. Specifically, in act 472, computer 200 checks if the field is a key, and if the field is in the page buffer. If the answer is no, then computer 200 goes to act 478 to check if each header record field has been processed and if not returns to act 471. If the answer in act 472 is yes, then computer 200 goes to act 474 to determine the field type (e.g. character, date, numeric) and thereafter as the field name and value as a string into the criteria in the wherein clause of the SQL query to be executed to retrieve the data the user is requesting. Next computer 200 goes to act 478 (described above). When the loop is completed in act 478, computer 200 returns from the method 470, after modifying the SQL query with additional criteria based on parameter security rules.

An illustrative implementation of act 408 performed by computer 200 is now described in reference to a method 499 called "BuildSQL" shown in FIG. 4J in the context of an example illustrated in FIG. 4H. Specifically, an SQL query 481 of the type illustrated in FIG. 4H is automatically formed in computer memory 1106 by computer 200 creating multiple strings, such as strings 482-485 that are combined to form the SQL query, e.g. by concatenation.

Specifically, as illustrated in FIG. 4J, in an act 486, computer 200 loops through each parameter that has been secured in the current component to perform the following acts 487-495. In act 487, computer 200 checks if the current parameter is present (i.e. does the current parameter exist?) in a detail record (e.g. see FIG. 3T) of the current component, and if not computer 200 simply returns to act 486 (e.g. because non-existence means the current parameter is not to be secured). If the answer in act 487 is yes, computer 200 goes to act 488 (FIG. 4J) and creates a new alias for a table (in computer memory 1106) which holds a parameter security rule for the current parameter.

In one illustrative example of act 488, the current parameter is DEPTID and hence computer 200 checks a detail record of the type illustrated in FIG. 3T, and identifies table %EDIT_DEPT as the parameter security rule table (because it holds user-accessible values for the parameter DEPTID). Note at that by this stage, the variable %EDIT_DEPT is already initialized in computer memory 1106 by computer 200, e.g. to the value "SEC_DEPT_USER" identifying the above-described table 257. In this illustrative example (FIG. 4H), computer 200 creates alias "Fld1" in act 488, by concatenating a value of loop-count (e.g. 1) with a predetermined string "Fld."

Next, in act 489, computer 200 forms string 485C in computer memory 1106 by concatenating the following character strings: (1) "AND", (2) the newly-created alias of the parameter security rule table, (3) "." (4) name of identifier of current product (e.g. the name PRODSRCID), (5) "=" and (6) value of identifier of the current product (e.g. the value "FGL", which identifies the General Ledger product in the PeopleSoft Financial product line). Accordingly, on performing act 489 for this illustrative example, computer 200 automatically creates the string 485C (i.e. the string AND Fld1.PRODSRCID='FGL').

Thereafter, in act 490, computer 200 evaluates the type of security to be applied for securing the current parameter. If the security type is user id, then computer 200 performs act 491 to create the string 485D in computer memory 1106 as follows. Specifically, in act 491, computer 200 concatenates the following strings: (1) "AND", (2) the alias of the parameter security rule table, (3) "." (4) name of identifier of current user (e.g. the name OP RID), (5) "=" and (6) value of identifier of the current user (e.g. the value "VP1"). Accordingly, on performing act 491 for this illustrative example, computer 200 automatically creates string 485D (i.e. the string AND Fld1.OPRID ='VP1').

Next, in act 492, computer 200 forms string 485B in computer memory 1106 by concatenating the following strings: (1) "WHERE", (2) another alias 482B of the detail table 482A of the current component, (3) period "." (4) value of identifier of current parameter (e.g. the value DEPTID), (5) "=" (6) the alias of the parameter security rule table, (7) "." (8) the value of identifier of current parameter (e.g. the value DEPTID). Accordingly, on performing act 492 for this illustrative example, computer 200 automatically creates string 485B (i.e. the string WHERE A.DEPTID=Fld1.DEPTID).

Then computer 200 goes to act 493 to create a string ("parameter security criteria string") based on the strings created in acts 489, 491 and 492 and further based on the alias of the parameter security rule table and the name of the parameter security rule table. Specifically, in the above-described example, computer 200 initially creates string 485A by concatenating a predetermined string "AND (NOT EXISTS (SELECT 'X' FROM" with (1) a name of the security parameter table which was looked up in act 488 from the detail record, i.e. name "SEC_DEPT_USER" which identifies the above-described table 257; and (2) the alias thereof created in act 488 (e.g. "Fld1"). Hence, on performing act 493 for this illustrative example, computer 200 automatically creates string 485A (i.e. the string "AND (NOT EXISTS (SELECT 'X' FROM SEC_DEPT_USER Fld1." Note that computer 200 also enters act 492 from acts 497 and 498 that are similar to act 491 described above, except that the security type is different, e.g. role or permission list.

Thereafter, in act 494 computer 200 concatenates the above-described four strings 485A-485D and appends closing parenthesis 485E sufficient in number (e.g. 2 in this example) to form a string 485 in conformance with SQL grammar (also called "parameter security criteria string"). On completion of act 494, computer 200 goes to act 495 to check if the looping condition has been met (e.g. that each parameter in the component has been visited), and if not computer 200 returns to act 486. If the answer in act 495 is yes, then computer 200 goes to act 496, described next.

In act 496, computer 200 creates three strings, namely (1) an alias identifier string 482 that identifies the current component's detail record 482A with the detail record's alias 482B, and further identifies the header record 482C with the header record's alias 482D, (2) field criteria string 483 that enumerates each criteria from the currently screen that is to be used to retrieve data from the database, and (3) a join string 484 that specifies names of parameters in the header record 482C that are to match corresponding parameters in the detail record 482A.

Note that strings 482-484 are created in a manner similar or identical to the manner in which a current component forms a SQL statement to query database 1110 in the normal manner in the absence of parameter security. For this reason, strings 482-484 are also referred to herein as unsecured strings 482-484. Thereafter, in act 497, computer 200 automatically builds SQL statement 481 by concatenating the unsecured strings 482-484 with parameter security criteria string 485. Note that by using the phrase "NOT EXISTS" in the string 485A of FIG. 4H, computer 200 automatically ensures that if during execution of SQL query 481 (in act 411 as described above), any value for the parameter e.g. "DEPTID" found by using alias identifier string 482, field criteria string 483 and join string 484 is not present in table 257, then an error condition is flagged (in act 412 also described above).

In one illustrative embodiment, computer 200 does not issue the SQL query 481 directly to database 1110, and instead embeds query 481 within a WHERE clause of another SQL string that identifies an installation table namely PS INSTALLATION as illustrated in FIG. 4I. Specifically, computer 200 concatenates the string "SELECT 'X' FROM PS_INSTALLATION WHERE EXISTS (" with the SQL query 481 followed by a parenthesis, and the result thereof is used to query database 1110. Note that computer 200 creates the SQL query of FIG. 4I in a manner similar to that described above in reference to FIG. 4H. Specifically, the SQL query in FIG. 4I is automatically created when the partial access option in computer 200 is set to Grant Access whereas the SQL query in FIG. 4H is automatically created when the partial access option in computer 200 is set to Deny Access.

The method of FIGS. 2A and 3A may be used to program a computer 200 of the type illustrated in FIG. 5A which is discussed next. Specifically, computer 200 includes a bus 1102 (FIG. 5A) or other communication mechanism for communicating information, and a processor 1105 coupled with bus 1102 for processing information. Computer 200 also includes a main memory 1106, such as a random access memory (RAM) or other dynamic storage device, coupled to bus 1102 for storing information and instructions (e.g. for the method of FIGS. 2A and 3A) to be executed by processor 1105.

Main memory 1106 also may be used for storing temporary variables or other intermediate information (e.g. tables 232 and 240 shown in FIG. 2I) during execution of instructions to be executed by processor 1105. Computer 200 further includes a read only memory (ROM) 1104 or other static storage device coupled to bus 1102 for storing static information and instructions for processor 1105. A storage device 1110, such as a magnetic disk or optical disk, is provided and coupled to bus 1102 for storing information and instructions.

Computer 200 may be coupled via bus 1102 to a display device or video monitor 1112 such as a cathode ray tube (CRT) or a liquid crystal display (LCD), for displaying information to a computer user. An input device 1114, including alphanumeric and other keys (e.g. of a keyboard), is coupled to bus 1102 for communicating information and command selections to processor 1105. Another type of user input device is cursor control 1116, such as a mouse, a trackball, or cursor direction keys for communicating direction information and command selections to processor 1105 and for controlling cursor movement on display 1112. This input device typically has two degrees of freedom in two axes, a first axis (e.g., x) and a second axis (e.g., y), that allows the device to specify positions in a plane.

As described elsewhere herein, collecting and analyzing statistics of components in a distributed database system is performed by computer 200 in response to processor 1105 executing one or more sequences of one or more instructions contained in main memory 1106. Such instructions may be read into main memory 1106 from storage device 1190. Execution of the sequences of instructions contained in main memory 1106 causes processor 1105 to perform the operations of a process described herein and illustrated in FIGS. 2A-2P and 3A-3N. In alternative embodiments, hard-wired circuitry may be used in place of or in combination with software instructions to implement the invention. Thus, embodiments of the invention are not limited to any specific combination of hardware circuitry and software.

The term "computer-readable storage device" as used herein refers to any storage device that participates in providing instructions to processor 1105 for execution. Such a storage device may take many forms, including but not limited to (1) non-volatile storage device, and (2) volatile storage device. Common forms of non-volatile storage devices include, for example, a floppy disk, a flexible disk, hard disk, optical disk, magnetic disk, magnetic tape, or any other magnetic device, a CD-ROM, any other optical device, punch cards, paper tape, any other physical devices with patterns of holes, a PROM, and EPROM, a FLASH-EPROM, any other memory chip or cartridge that can be used as storage device 1110. Volatile storage devices includes dynamic memory, such as main memory 1106 which may be implemented in the form of a random access memory or RAM.

Instead of or in addition to use of a storage device, transmission link may be used to provide instructions to processor 1105. A transmission link includes coaxial cables, copper wire and fiber optics, including the wires that comprise bus 1102. A transmission link can also take the form of acoustic or light waves, such as those generated during radio-wave and infra-red data communications, any of which can be used to implement a carrier wave as described herein.

Accordingly, instructions to processor 1105 can be provided by a transmission link or by a storage device from which a computer can read information, such as data and/or code. Specifically, various forms of transmission link and/or storage device may be involved in providing one or more sequences of one or more instructions to processor 1105 for execution. For example, the instructions may initially be held in a storage device, such as a magnetic disk, of a remote computer. The remote computer can load the instructions from such a storage device into its dynamic memory (RAM) and then send the instructions over a telephone line using a modem, to computer 200.

A modem local to computer 200 can receive the information on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processor 1105 retrieves and executes the instructions. The instructions received by main memory 1106 may optionally be stored on storage device 1190 either before or after execution by processor 1105. Note that in addition to instructions, memory 1106 and storage device 1190 also hold various data, such as, for example, the screens illustrated in FIGS. 2E-2S and FIGS. 3B-3M.

Computer 200 also includes a communication interface 1115 coupled to bus 1102. Communication interface 1115 provides a two-way data communication coupling to a network link 1120 that is connected to a local network 1122. Local network 1122 may interconnect multiple computers (as described above). For example, communication interface 1115 may be an integrated services digital network (ISDN) card or a modem to provide a data communication connection to a corresponding type of telephone line. As another example, communication interface 1115 may be a local area network (LAN) card to provide a data communication connection to a compatible LAN. Wireless links may also be implemented. In any such implementation, communication interface 1115 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1115, which carry the digital data to and from computer system 200, are exemplary forms of carrier waves transporting the information.

Computer 200 can send messages and receive data, including program code, through the network(s), network link 1120 and communication interface 1115. In the Internet example, a server 1100 might transmit statistics of components in a distributed database system through Internet 1124, ISP 1126, local network 1122 and communication interface 1115. The instructions for performing the operations of FIGS. 2A and 3A may be executed by processor 1105 as they are received, and/or stored in storage device 1110, or other non-volatile storage for later execution. In this manner, computer system 200 may obtain the just-described instructions and any related data.

Figure 5A:
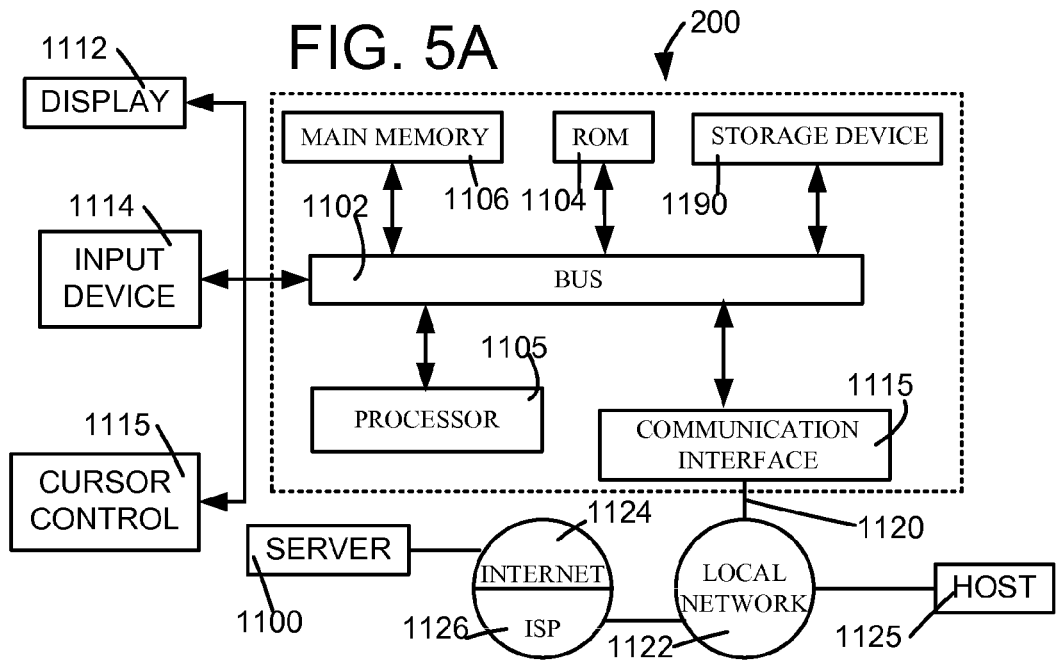
FIGS. 5A and 5B illustrate, in block diagrams, hardware and software portions of a computer that performs the methods illustrated in FIGS. 2A and 3A.
Figure 5B:
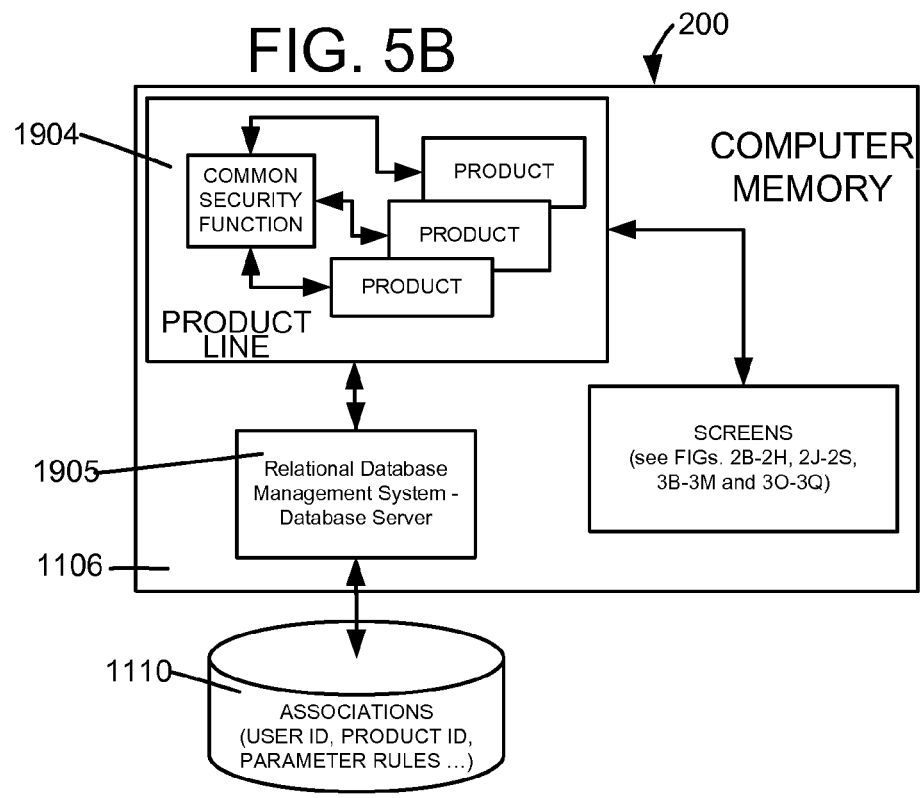

Note that FIG. 5A is a very low-level representation of many hardware components of a computer system. Several embodiments have one or more additional software components in main memory 1106 as shown in FIG. 5B: Database Server 1905 (e.g. ORACLE) that provides access to a database 1110, and accounting software 1904 which changes records in the database 1110 via an interface provided a database management system in server 1905. As noted above, database 1110 in accordance with the invention holds associations e.g. between a user's identity and one or more parameter security rules, e.g. in tables 232 and 240 illustrated in FIG. 2I. Memory 1106 typically holds screens generated by software products in software 1904, for transmission to remote computers. Note that accounting software 1904 in accordance with the invention is a product line of multiple software products that use a common security function as described herein.

Numerous modifications and adaptations of the embodiments described herein will become apparent to the skilled artisan in view of this disclosure.

Numerous modifications and adaptations of the embodiments described herein are encompassed by the scope of the invention.

What is claimed is:

1. One or more non-transitory computer-readable media comprising a plurality of instructions to be executed by at least one computer, the plurality of instructions comprising:

instructions to receive in the at least one computer, via one or more administration screens, a parameter-security rule comprising at least one value of a parameter identified by a specific name in said one or more administration screens, and store the parameter-security rule in a memory of the at least one computer, the parameter being used in common by a plurality of software products comprised in a product line of software executed by the at least one computer;

instructions to receive, via said one or more administration screens, an identification of the parameter-security rule, an identifier of a user on whom the parameter-security rule is to be enforced during usage of the plurality of software products, and an identity of a specific software product selected from among the plurality of software products for application of the parameter-security rule;

instructions to store in the memory of the at least one computer, an association between the identification of the parameter-security rule, the identifier of the user and the identity of the specific software product;

instructions to receive, via one or more user screens, input from a first user requiring execution of the specific software product;

instructions to automatically use a first identification of the first user from whom the input is received via said one or more user screens, the identity of the specific software product and the association in the memory, to retrieve the parameter-security rule from the memory, and automatically apply the parameter-security rule at a level of values of said parameter to select from among information available to the at least one computer, a first subset of the information authorized by the parameter-security rule and exclude a second subset of the information unauthorized by the parameter-security rule;

instructions to execute the specific software product using the first subset and not using the second subset; and instructions to automatically store in the memory of the at least one computer, a result of execution of the specific software product;

wherein different parameter-security rules are used by the plurality of instructions in securing user access to a value of the parameter differently for different software products in the product line of software.

2. The one or more non-transitory computer-readable media of claim 1 wherein the parameter-security rule is hereinafter "first rule" and the parameter is hereinafter "first parameter" and wherein the plurality of instructions further comprise:

instructions to receive a second rule comprising at least a second value of a second parameter among a plurality of parameters used in the plurality of software products; and instructions to apply the second rule on the second parameter in addition to application of the first rule to the first parameter, when the first subset is automatically selected.

3. The one or more non-transitory computer-readable media of claim 2 wherein:

the first parameter comprises a first identifier to identify a type of a transaction entered into the plurality of software products; and the second parameter comprises a second identifier of a specific department in an organization, the specific department being affected by said transaction.

4. The one or more non-transitory computer-readable media of claim 2 wherein:

the first parameter comprises a first identifier to identify a type of transaction entered into the plurality of software products; and the second parameter comprises a second identifier of a fund affected by said transaction.

5. The one or more non-transitory computer-readable media of claim 2 wherein:

the plurality of instructions further cause the at least one computer to deny access to the first user, when either of the first rule or the second rule is not satisfied; and the plurality of instructions cause the at least one computer to check whether the first subset satisfies each of the first rule and the second rule.

6. The one or more non-transitory computer-readable media of claim 1 wherein:

on execution, the specific software product displays to the first user, a list of values from which a single value is to be selected for input to the specific software product; and the first subset comprises the values in the list and the second subset comprises additional values acceptable to the specific software product and excluded by application of the parameter-security rule.

7. The one or more non-transitory computer-readable media of claim 1 wherein:

the input from the first user is to access the specific software product, to inquire about a transaction; and the first subset comprises the transaction selected from among a plurality of transactions accessible to the at least one computer.

8. The one or more non-transitory computer-readable media of claim 1 wherein:

the plurality of instructions further cause the at least one computer to receive for the first user, via said one or more administration screens, an indication of a component within the specific software product to be excepted from rule checking; and based on the indication, the plurality of instructions further cause the at least one computer to execute the component regardless of any rule.

9. The one or more non-transitory computer-readable media of claim 1 wherein:

the parameter is an accounting code;

the at least one value is one of a plurality of values of the accounting code; and the information comprises an accounting transaction.

10. A method implemented by at least one computer, the method comprising:

receiving, via one or more administration screens, a parameter-security rule comprising at least one value of a parameter identified by a specific name in said one or more administration screens, and storing the parameter-security rule in a memory of the at least one computer;

wherein the parameter is used in common by a plurality of products comprised in a product line of software executed by the at least one computer;

receiving, via said one or more administration screens, an identification of the parameter-security rule, an identifier of any user on whom the parameter-security rule is to be enforced during usage of the plurality of products, and an identity of a specific product selected from among the plurality of products for application of the parameter-security rule, and storing in the memory of the at least one computer, an association between the identification of the parameter-security rule, the identifier of the user and the identity of the specific product;

receiving, via one or more user screens, input requiring execution of the specific product;

automatically using a first identification of a first user from whom the input is received via said one or more user screens, the identity of the specific product and the association in the memory, to retrieve the parameter-security rule from the memory, and automatically apply the parameter-security rule at a level of values of said parameter to select from among information available to the at least one computer, a first subset of the information authorized by the parameter-security rule and exclude a second subset of the information unauthorized by the parameter-security rule; and executing the specific product using the first subset and not using the second subset; and automatically storing in the memory of the at least one computer, a result of execution;

wherein different parameter-security rules are used by the method in securing user access through the GUI to a value of the parameter differently for different products in the product line.

11. The method of claim 10 wherein said parameter-security rule is hereinafter "first rule" and said parameter is hereinafter "first parameter" and the method further comprises:

receiving a second rule comprising at least a second value of a second parameter among a plurality of parameters used in the plurality of products; and applying the second rule on the second parameter in addition to application of the first rule to the first parameter, when the first subset is automatically selected.

12. The method of claim 11 wherein:
the first parameter comprises a first identifier of a type of a transaction entered into the plurality of products; and
the second parameter comprises a second identifier.

13. The method of claim 11 wherein:
the product line of software is an accounting software product line;
the first parameter comprises a first identifier of an account used to identify a type of an accounting transaction entered into the plurality of products; and
the second parameter comprises a second identifier of a fund.

14. The method of claim 11 further comprising:
receiving a default option to deny user access when either of the first rule or said second rule is not satisfied; and
checking whether the first subset satisfies each of the first rule and the second rule.

15. The method of claim 10 further comprising:
displaying a list of values from which a single value is to be selected for input to the specific product;

wherein said first subset comprises the values in the list and the second subset comprises additional values acceptable to the specific product and excluded by application of the parameter-security rule.

16. The method of claim 10 wherein:
the input from the first user is to access the specific product, to inquire about a transaction; and
the first subset comprises said transaction selected from among a plurality of transactions accessible to the at least one computer.

17. The method of claim 10 further comprising:
receiving an indication of a component within the specific product to be excepted from rule checking for the first user, prior to receipt of the input from the first user; and
based on the indication, executing the component regardless of any rule.

18. An apparatus to secure access to information, the apparatus comprising:

means for receiving, via one or more administration screens, a parameter-security rule comprising at least one value of a parameter identified by a specific name in said one or more administration screens, and for storing the parameter-security rule in a memory of a computer;

wherein the parameter is used in common by a plurality of products comprised in a product line of software executed by the computer;

means for receiving, via said one or more administration screens, an identification of the parameter-security rule, an identifier of a user on whom the parameter-security rule is to be enforced during usage of the plurality of products, and an identity of a specific product selected from among the plurality of products for application of the parameter-security rule, and for storing in the memory of the computer, an association between the identification of the parameter-security rule, the identifier of the user and the identity of the specific product;

means for receiving, via one or more user screens, input from a first user requiring execution of the specific product;

means for automatically using a first identification of the first user from whom the input is received via said one or more user screens, the identity of the specific product and the association in the memory, to retrieve the parameter-security rule from the memory, and automatically apply the parameter-security rule at a level of values of said parameter to select from among information available to the computer, a first subset of said information authorized by the parameter-security rule and exclude a second subset of said information unauthorized by the parameter-security rule;

means for executing the specific product using the first subset and not using the second subset; and means for automatically storing in the memory of the computer, a result of execution;

wherein different parameter-security rules are used in securing user access to a value of said parameter differently for different products in the product line.

19. The apparatus of claim 18 wherein:
said parameter is an accounting code;
said at least one value is one of a plurality of values of the accounting code; and
said information comprises an accounting transaction.

20. A system comprising:
at least one processor coupled to at least one memory;
wherein the at least one memory comprises a plurality of instructions executable by the at least one processor, the plurality of instructions comprising:

instructions to receive, via one or more administration screens, a parameter-security rule comprising at least one value of a parameter identified by a specific name in said one or more administration screens, the parameter being used in common by a plurality of software products comprised in a product line of software;

instructions to receive, via said one or more administration screens, an identification of the parameter-security rule, an identifier of a user on whom the parameter-security rule is to be enforced during usage of the plurality of software products, and an identity of a specific software product selected from among the plurality of software products for application of the parameter-security rule;

instructions to store an association between the identification of the parameter-security rule, the identifier of the user and the identity of the specific software product;

instructions to receive, via one or more user screens, input requiring execution of the specific software product;

instructions to automatically use a first identification of a first user from whom the input is received via said one or more user screens, the identity of the specific software product and the association in the memory, to automatically apply the parameter-security rule at a level of values of said parameter to select from among information available, a first subset of the information authorized by the parameter-security rule and exclude a second subset of the information unauthorized by the parameter-security rule;

instructions to execute the specific software product using the first subset and not using the second subset; and instructions to automatically store in the at least one memory, a result of execution of the specific software product;

wherein different parameter-security rules are used in securing user access to a value of the parameter differently for different software products in the product line of software.

21. The system of claim 20 further comprising:
instructions to receive an indication of a component within said specific software product to be excepted from rule checking for the first user, prior to receipt of the input from the first user; and
instructions to execute said component regardless of any rule.

22. The system of claim 20 wherein:
said parameter is an accounting code;
said at least one value is one of a plurality of values of the accounting code; and
said information comprises an accounting transaction.

23. The non-transitory computer-readable medium of claim 1 wherein:
at least one product in the plurality of software products is an accounting software product.

24. The non-transitory computer-readable medium of claim 1 wherein:
the parameter-security rule is to be received, on execution of the plurality of instructions, via an administration screen comprised in the plurality of administration screens of a graphical user interface (GUI) in the at least one computer; and
the input from the first user is to be received, on execution of the plurality of instructions, via a user screen comprised in the plurality of user screens in the GUI.

25. The non-transitory computer-readable medium of claim 24 wherein:
the identification of the parameter-security rule, the identifier of the user, and the identity of the specific software product are to be received, on execution of the plurality of instructions, via another administration screen in the GUI.

26. The method of claim 10 wherein:
at least one product in the plurality of software products is an accounting software product.

27. The method of claim 10 wherein:
the parameter-security rule is received via an administration screen comprised in a plurality of administration screens of a graphical user interface (GUI) in the at least one computer; and
the input from the first user is received via a user screen in the GUI.

28. The method of claim 27 wherein:
the identification of the parameter-security rule, the identifier of the user, and the identity of the specific software product are received via another administration screen in the GUI.

29. The method of claim 10 wherein:
said parameter is an accounting code;
said at least one value is one of a plurality of values of the accounting code; and
said information comprises an accounting transaction.

30. The one or more non-transitory computer-readable media of claim 1 wherein the parameter-security rule is hereinafter "first rule", the "specific software product" is hereinafter "first product", the identity is hereinafter "first identity", and wherein the plurality of instructions further comprise:
instructions to receive a second rule comprising at least a second identity of a second product in the plurality of software products; and
instructions to apply the second rule to provide full access to said information for use by the second product, on execution thereof in response to a different input from the first user.

31. The method of claim 10 wherein the parameter-security rule is hereinafter "first rule", the "specific software product" is hereinafter "first product", the identity is hereinafter "first identity", and wherein the method further comprises:
receiving a second rule comprising at least a second identity of a second product in the plurality of software products; and
applying the second rule to provide full access to said information for use by the second product, on execution thereof in response to a different input from the first user.

* * * * *

UNITED STATES PATENT AND TRADEMARK OFFICE
CERTIFICATE OF CORRECTION

PATENT NO. : 9,147,190 B2  
APPLICATION NO. : 12/697196  
DATED : September 29, 2015  
INVENTOR(S) : Mora et al.

Page 1 of 1

It is certified that error appears in the above-identified patent and that said Letters Patent is hereby corrected as shown below:

In the specification

Column 3, line 58, delete "FIGS. 1A-1 E" and insert -- FIGS. 1A-1E --, therefor.

Column 4, line 13, delete "30-3Q" and insert -- 3O-3Q --, therefor.

Signed and Sealed this  
Thirty-first Day of May, 2016

Michelle K. Lee  
*Director of the United States Patent and Trademark Office*